(12) United States Patent
Ranney et al.

(10) Patent No.: US 10,436,897 B2
(45) Date of Patent: Oct. 8, 2019

(54) SYSTEM FOR DETECTING MAN-MADE OBJECTS USING POLARIMETRIC SYNTHETIC APERTURE RADAR IMAGERY WITH ERROR REDUCTION AND METHOD OF USE

(71) Applicant: United States of America as Represented by the Secretary of the Army (Army Research Laboratory), Adelphi, MD (US)

(72) Inventors: Kenneth Irving Ranney, Rockville, MD (US); David Chun Wong, Clarksville, MD (US); Tuan That Ton, Springfield, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 422 days.

(21) Appl. No.: 15/423,723

(22) Filed: Feb. 3, 2017

(65) Prior Publication Data
US 2018/0052229 A1 Feb. 22, 2018

Related U.S. Application Data

(63) Continuation-in-part of application No. 14/563,270, filed on Dec. 8, 2014, now Pat. No. 9,885,784.

(51) Int. Cl.
*G01S 13/90* (2006.01)
*G01S 7/02* (2006.01)
(Continued)

(52) U.S. Cl.
CPC .............. *G01S 13/90* (2013.01); *G01S 7/024* (2013.01); *G01S 7/025* (2013.01); *G01S 7/292* (2013.01);
(Continued)

(58) Field of Classification Search
CPC .... G01S 13/9076; G01S 13/90; G01S 13/904; G01S 7/025; G01S 13/9023;
(Continued)

(56) References Cited

U.S. PATENT DOCUMENTS 5,313,210 A * 5/1994 Gail ....................... G01S 7/025
342/174
6,750,805 B1 6/2004 Cameron
(Continued)

OTHER PUBLICATIONS

K. Shlager, et al., "TEM Horn Antenna for Pulse Radiation: an Improved Design." Micro. Opt. Tech Letters 1996 12(2), 86-90.
(Continued)

*Primary Examiner* — Olumide Ajibade Akonai
(74) *Attorney, Agent, or Firm* — Lawrence E. Anderson

(57) ABSTRACT

A system for determining the location of a man-made object based upon symmetry of the object comprising a receiver configured to receive radar signals comprising cross-polarized and co-polarized responses; at least one processor configured to combine the horizontal-horizontal polarimetric responses and vertical-vertical polarimetric responses to form co-polarimetric images and operate on one or both of the vertical-horizontal polarimetric responses and horizontal-vertical polarimetric responses to form cross-polarized images; the at least one processor configured to process the co-polarized and cross-polarized images to locate areas of interest containing a maximum in the co-pol image and a null state in the co-pol image indicating the potential detection of a man-made object; the at least one processor being configured to filter data using buffer regions and/or skipping of pixels in the vicinity of an area of interest. A method for detection of man-made objects is also disclosed.

20 Claims, 18 Drawing Sheets
(2 of 18 Drawing Sheet(s) Filed in Color)

(51) Int. Cl.
G01S 13/88 (2006.01)
G01S 7/292 (2006.01)
G01S 13/86 (2006.01)
G01S 7/41 (2006.01)

(52) U.S. Cl.
CPC .............. *G01S 7/412* (2013.01); *G01S 13/86* (2013.01); *G01S 13/867* (2013.01); *G01S 13/885* (2013.01); *G01S 13/887* (2013.01); *G01S 13/9076* (2019.05)

(58) Field of Classification Search
CPC ........ G01S 7/4004; G01S 17/89; G01S 7/024; G01S 7/411; G01S 7/4802; G06F 17/18; H01Q 21/24
See application file for complete search history.

(56) References Cited

U.S. PATENT DOCUMENTS

| | | | | |
|---|---|---|---|---|
| 7,068,990 | B1* | 6/2006 | Herbig | H04B 1/126 455/295 |
| 7,825,847 | B2* | 11/2010 | Fujimura | G01S 7/025 342/25 R |
| 8,125,370 | B1* | 2/2012 | Rogers | G01S 7/025 342/25 F |
| 9,395,437 | B2 | 7/2016 | Ton et al. | |
| 2004/0032361 | A1* | 2/2004 | Kirscht | G01S 13/9029 342/25 R |
| 2007/0047678 | A1* | 3/2007 | Sibecas | H04B 1/7115 375/343 |
| 2007/0222661 | A1* | 9/2007 | Stagliano, Jr. | G01S 7/025 342/26 R |
| 2014/0062764 | A1* | 3/2014 | Reis | G01S 13/9023 342/25 C |

OTHER PUBLICATIONS

T.H. Chao, et al. "Large Wideband Dual Polarized Array of Vivaldi Antennas with Radome." Asia Pacific Microwave Conference, vol. 1, Singapore, Institute of Electrical and Electronic Engineering, 92-95, 1999.

Cloude SR, Pottier E., "A review of target decomposition theorems in radar polarimetry," IEEE Trans on Geoscience and Remote Sensing. Mar. 1996;34(2):498-518.

Nghiem SV, Yueh SH, Kwok R, Li FK, "Symmetry properties in polarimetric remote sensing," Radio Science. Sep.-Oct. 1992;27(5):693-711.

Nolfgang-Martin Boehner, "Basic Concepts in Radar Polarimetry" Polsarpro V3.0—Lecture Notes, http://earth.esa.int/landtraining07/polsar_basic_concepts.pdf (circa 2007).

Pottier, Eric, et al. "Polsarpro V3.0—Lecture Notes 1—Advanced Concepts" (circa 2007).

Simms, Janet E., "Applications of Synthetic Aperture Radar (SAR) to Unexploded Ordnance (UXO) Delineation," ERDC/GSL TR-03-15, US Army Corps of Engineers, Engineering Research and Development Center, Aug. 2003.

Moriyama T, Uratsuka S. et al. "A study on extraction of urban areas from polarimetric synthetic aperture radar image," Proceedings of the 2004 IEEE International Geoscience and Remote Sensing Symposium, 2004. p. 703-706.

Zhang L., Zhang J, Zou B, Zhang Y., "Comparison of methods for target detection and applications using polarimetric SAR image," PIERS Online. 2008;4(1):140-145.

Ei-Darymli K, McGuire P, Power D, Moloney C. "Target detection in synthetic aperture radar imagery: a state-of-the-art survey.," SPIE Journal of Applied Remote Sensing. 2013;7:071598-1-071598-35.

V. Alberga, E. Krogager, M. Chandra, and G. Wanielik, "Potential of coherent decompositions in SAR polarimetry and interferometry," Proceedings of the 2004 IEEE Geoscience and Remote Sensing Symposium, IGARSS '04, vol. 3, Sep. 20-24, 2004, pp. 1792-1795.

Novak, L.M., et al, "Optimal Polarimetric Processing for Enhanced Target Detection," IEEE Transactions on Aerospace and Electronic Systems, vol. 29, No. 1, Jan. 1993, pp. 234-244.

D. Liao, T. Dogaru, A. Sullivan, "Large-Scale, Full-Wave-Based Emulation of Step-Frequency Forward-Looking Radar Imaging in Rough Terrain Environments," Sensing and Imaging, vol. 15, Issue 1, Apr. 2014.

D. Liao, T. Dogaru, "Full-Wave Scattering and Imaging Characterization of Realistic Trees for FOPEN Sensing," IEEE Geosci. Remote Sens. Letters, issue 99, pp. 1-5, May 2016.

D. Liao and T. Dogaru, "Full-Wave Characterization of Rough Terrain Surface Scattering for Forward-Looking Radar Applications," IEEE Transactions on Antennas and Propagation, vol. 60, No. 8, Aug. 2012, pp. 3853-3866.

* cited by examiner

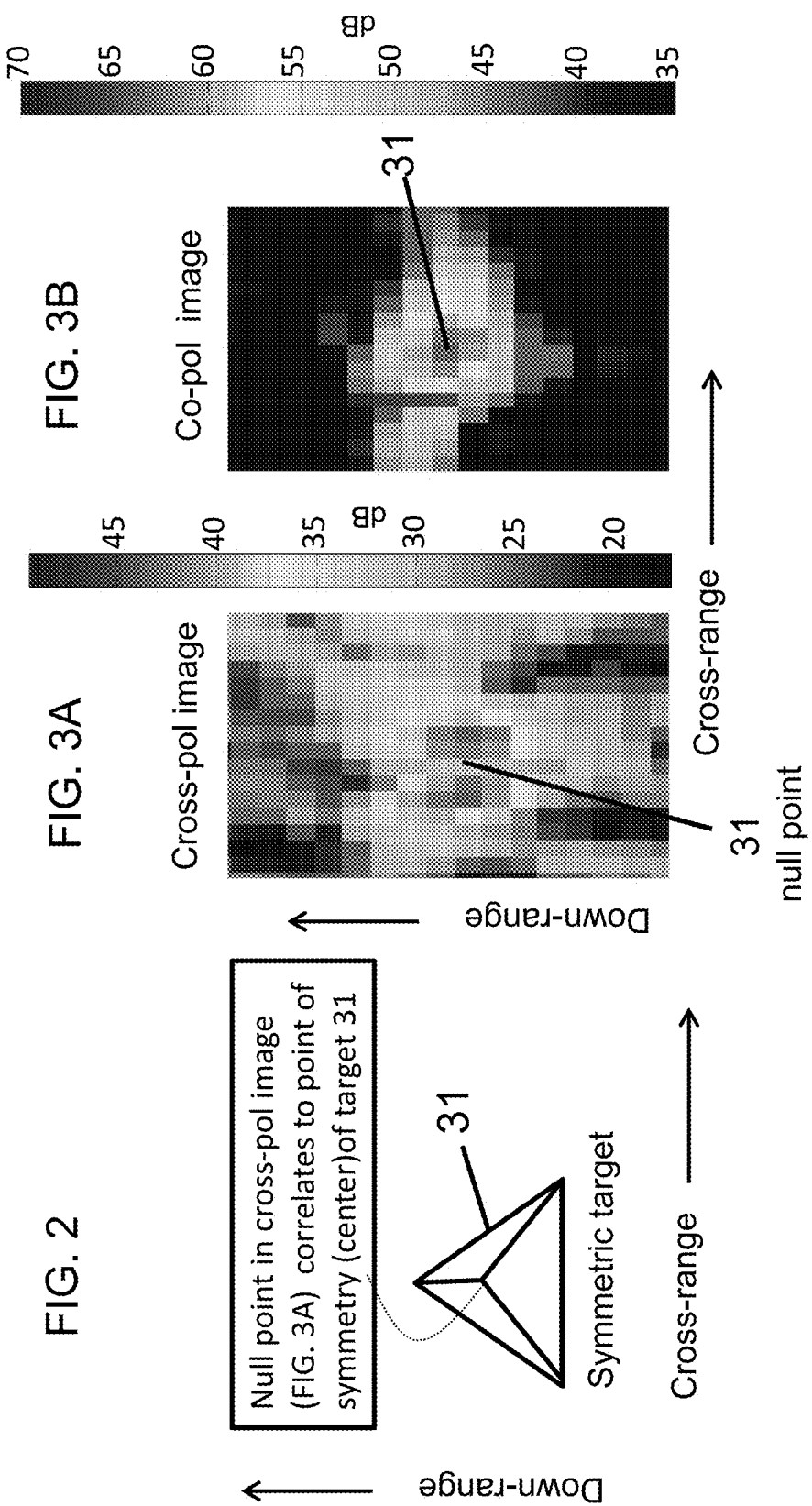

FIG. 5B DEFINITIONS

61 Image Definitions

$I_{cross}(x,y)$ represents the cross-polarized image pixels at (x,y) locations.

$I_{co}(x,y)$ represents the co-polarized image pixels at (x,y) locations.

62 floor value definition

$I_{cross-floor}(x,y) = \max(I_{cross}(x,y), floorval)$ represents the comparison operation - floor values replace the cross-polarized image pixels at (x,v) locations when less than a minimum floor value $I_{cross}(x,y) = \max(I_{cross}(x,y), floorval)$, where x and y denote image indices, $\max(I_{cross}(x,y), floorval) = I_{cross}(x,y)$ if $I_{cross}(x,y) > floorval$ and $\max(I_{cross}(x,y), floorval) = floorval$, otherwise. *floorval* may be determined experimentally.

$I_{filter,cross}(x,y) = I_{cross-floor}(x,y) * h_1$ ($h_1$ is a column vector each entry of which is 1 and correlates to spatial averaging)

$I_{filter,cross}(x,y) = I_{cross,floor}(x,y) * h_1 = \sum_{i=0}^{N_p} I(x, y - \lfloor N_p/2 \rfloor + i)$  If Np = 11, then summing pixels from y-5 → y+5

(Equation from Box 52 of FIG. 5)

63 $h_1$ definition convolution: a mathematical operation on two functions ($I_{cross}$ & $h_1$) that produces a third function ($I_{filter,cross}$) that is a modified version of the original function ($I_{cross}$), giving the integral of the pointwise multiplication of the two functions as a function of the amount that one of the original functions is translated. Source: Wikipedia.

64 $h_2$ definition

$I_{cross, background} = I_{filter, cross}(x,y) * h_2$ convolution of $I_{filter,cross}$ with $h_2$ relates to the guard area where certain pixels are "skipped."

$h_2$ operation: Input $I_{filter,cross}(x,y)$ is summed and the range summation skips m pixels on both sides of x; summing the remaining M−m pixels $$h_2(i,j) = \begin{cases} 1, 1 \leq i < M-m \\ 0, M-m \leq i \leq M+m \\ 1, M+m < i \leq 2M+1 \end{cases}$$

$I_{filter,cross}(x,y) = I_{filter,cross}(x,y) * h_{2a} \quad I_{filter,cross}(x,y) * h_{2b}$ $I_{cross, background}(x,y) = I_{filter,cross}(x,y) * h_2 = \sum_{i=m+1}^{M} I_{filter,cross}(x-i,y) + \sum_{i=m+1}^{M} I_{filter,cross}(x+i,y)$ (Equation shown in Box 53 of FIG. 5)

65 $T_1$ definition

$$T_1(x,y) = \frac{I_{filter, co}(x,y)}{I_{cross contrast}(x,y)} \quad I_{cross contrast}(x,y) = \frac{I_{filter,cross}(x,y)}{I_{cross,background}(x,y)}$$

$I_{filter, co-pol}$ generally is equal to $I_{co-pol}$ (Note: If there is a target this ratio will be small)

(Equation shown in Box 54 of FIG. 5)

FIG. 5C Polarimetric Manmade Object Detector (PMOD) Equation Definitions

65 $T_1$ definition (Continued)

$$T_1(x,y) = \frac{I_{filter,\,co}(x,y)}{I_{cross\,contrast}(x,y)}$$

$I_{filter,\,co\text{-}pol}$ generally is equal to $I_{co\text{-}pol}$ $T_1(x,y)$ is the ratio of the $I_{co\text{-}pol}$ to the $I_{cross\,contrast}$ at coordinate (x,y). For example, at the center of the co-pol image (shown in 59) the large co-pol value will be divided by the small cross-poll value, which is further suppressed by large responses on either side of it. Denominator in equation below describes how this further suppression of the cross-pol null value is achieved. (Note: If target is present ratio will be small)

$$I_{cross\,contrast}(x,y) = \frac{I_{filter,\,cross}(x,y)}{I_{cross\,background}(x,y)}$$

Denominator of $T_1(x,y)$; i.e. $I_{cross,\,contrast}(x,y)$, will be small if a target is present so that value of $T_1(x,y)$ will be large 66 PMOD definition $$PMOD(x,y) = T_1(x,y) \left( \frac{\min(I_{filter,\,cross}(x,y)*h_{2a}, I_{filter,\,cross}(x,y)*h_{2b})}{\max(I_{filter,\,cross}(x,y)*h_{2a}, I_{filter,\,cross}(x,y)*h_{2b})} \right)$$

55 (Equation shown in Box 55 of FIG. 5)

If a target is present at (x,y) the min. and max. in 55 will be nearly the same so the ratio between the min. and max. will be close to 1.

$\min(I_{filter,\,cross}(x,y)*h_{2a}, I_{filter,\,cross}(x,y)*h_{2b})$ — Takes the smaller value of $\sum_{i=m-1}^{M} I_{filter,\,cross}(x-i,y)$ or $\sum_{i=m+1}^{M} I_{filter,\,cross}(x+i,y)$ $\max(I_{filter,\,cross}(x,y)*h_{2a}, I_{filter,\,cross}(x,y)*h_{2b})$ — Takes the larger value of $\sum_{i=m-1}^{M} I_{filter,\,cross}(x-i,y)$ or $\sum_{i=m+1}^{M} I_{filter,\,cross}(x+i,y)$

FIG. 5D Determination of $f_1$ (Shown in Box 44 of FIG. 4)

$$PMOD(x,y) = T_1(x,y) \frac{\min(I_{filter,cross}(x,y) * h_{2a}, I_{filter,cross}(x,y) * h_{2b})}{\max(I_{filter,cross}(x,y) * h_{2a}, I_{filter,cross}(x,y) * h_{2b})}$$ — 55

$\sum_{(i,j) \in \text{Target region}} PMOD(i,j)$ is the summation of the PMOD values for pixels within the TARGET region centered at location $(x,y)$. The target region may be a single pixel at location $(x,y)$.

$\sum_{(i,j) \in \text{Background region}} PMOD(i,j)$ is the summation of the PMOD values for pixels within the BACKGROUND region centered at location $(x,y)$.

$$f_1(x,y) = \frac{\dfrac{1}{N_{target\ region\ 1}} \left( \sum_{(i,j) \in \text{Target region 1}} PMOD(i,j) \right)}{\dfrac{1}{N_{Background\ region\ 1}} \left( \sum_{(i,j) \in \text{Background region 1}} PMOD(i,j) \right)}$$

Further eliminates false alarms

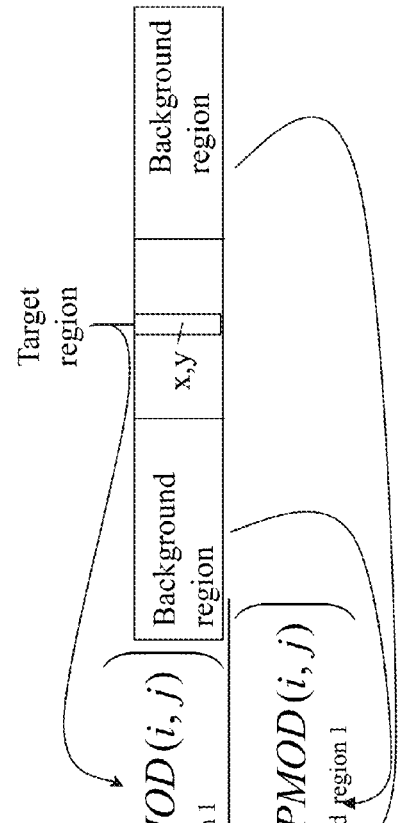

(x,y) pixel coordinates indicate location where evaluation is being conducted.
(i,j) pixel coordinates indicate locations that are being summed to evaluate whether (x,y) is a target
Preferred embodiment may test each pixel location (x,y) in an image for a target, FIG. 5E - Co-pol image filtering – spatial averaging $I_{co(x,y)}$ represents the co-polarized image pixels at (x,y) locations.

$I_{filter,co}(x,y) = I_{co}(x,y) * h_1$ ($h_1$ is a column vector each entry of which is 1 and correlates to spatial averaging)

$I_{filter,co}(x,y) = I_{co}(x,y) * h_1 = \sum_{i=0}^{N_p} I_{co}(x, y - \lfloor N_p/2 \rfloor + i)$    If Np = 11, then summing pixels from y-5 → y+5 convolution: a mathematical operation on two functions ($I_{cross}$ & $h_1$) that produces a third function ($I_{filter,cross}$) that is a modified version of the original function ($I_{cross}$), giving the integral of the pointwise multiplication of the two functions as a function of the amount that one of the original functions is translated. Source: Wikipedia.

Typically Np = 0, which eliminates the filtering step.
It is desirable to maintain large copol pixel values for targets. Spatial averaging could be useful if very high resolution with many large pixel values concentrated on the target and with large background pixel values dispersed and not spatially concentrated. Generally do not use when there are not many pixels on target (i.e. the pixel sizes are large) and the clutter samples do not have a large number of large values.

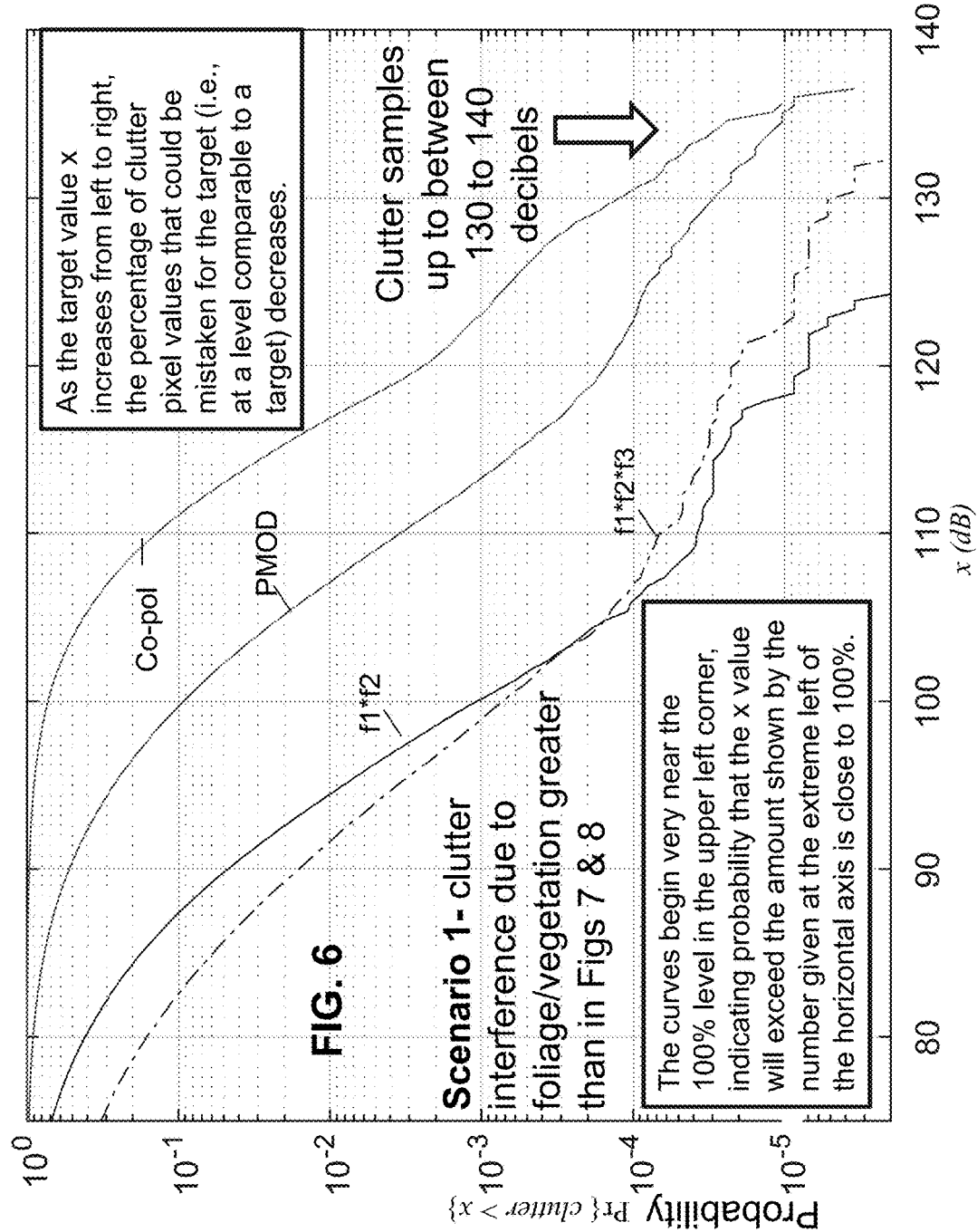

SYSTEM FOR DETECTING MAN-MADE OBJECTS USING POLARIMETRIC SYNTHETIC APERTURE RADAR IMAGERY WITH ERROR REDUCTION AND METHOD OF USE

CROSS REFERENCE TO RELATED APPLICATION

This application is a continuation-in-part application of and claims priority to U.S. patent application Ser. No. 14/563,270, entitled "Method and System for Detecting Man-made Objects Using Polarimetric Synthetic Aperture Radar Imagery," by Kenneth Irving Ranney, et al., filed Dec. 8, 2014, herein incorporated by reference in its entirety as though fully rewritten herein.

STATEMENT OF GOVERNMENT INTEREST

The invention described herein may be manufactured, used, and licensed by or for the United States Government without the payment of royalties.

BACKGROUND OF THE INVENTION

The present invention relates to polarimetric synthetic aperture radar. The synthetic aperture radar image is a two-dimensional image, with the two dimensions corresponding to cross-range (azimuth or travel direction) and slant-range (or lateral); each being perpendicular to each other. Synthetic aperture radar frequently uses a platform and the synthetic aperture correlates to the distance the SAR platform covers during the period in which a target can be observed from the forward extent of the azimuth view angle on the platform's approach to the aft extent of the azimuth view angle upon its departure. In addition, the electromagnetic radiation produced by synthetic aperture radar has a polarization. Such polarization is useful for identification of materials. Symmetric, man-made objects produce very different synthetic aperture radar (SAR) signatures when examined using different polarizations. This is especially noticeable when these objects are metal. By using radar pulses with a mixture of polarizations and receiving antennas with a specific polarization, different images can be collected from the same series of radar pulses.

The present invention also relates to detection of man-made objects. Since manmade objects often exhibit "left-right" symmetry not found in nature, sensors capable of detecting "left-right" symmetry have the capability of distinguishing manmade (symmetric) objects from naturally occurring (asymmetric) objects. Detection of large man-made or symmetrical objects using SAR imagery provided the radar aperture is in alignment with the longitudinal axis of the target is disclosed in "Applications of Synthetic Aperture Radar(SAR) to Unexploded Ordnance (UXO) Delineation," by Janet E. Simms, Duke University, ERDC/GSL TR-03-15, U.S. Army Corps of Engineers, (August 2003) (hereby incorporated by reference herein as though fully reproduced) with the caveat that naturally occurring clutter resulting from foliage resulted in false alarms and was problematic (pages 39 and 46, FIG. 12).

Detection of objects with specific sizes and shapes is disclosed in U.S. Pat. No.8,125,370 ('370 Patent) to Rodgers, et al, hereby incorporated by reference. The '370 Patent discloses a method for processing a polarimetric synthetic aperture radar (SAR) image of a region in order to screen large areas to identify candidate pixels that correspond to a position in the image that contains a candidate object. To obtain polarimetric SAR images, the system disclosed in the '370 Patent transmits and receives pulses with both horizontal and vertical polarization. Polarimetric SAR imagery consists of two, three or four independent channels of complex data (amplitude plus phase) consisting of HH (Horizontal transmit, Horizontal receive), HV (Horizontal transmit, Vertical receive), VV (Vertical transmit, Vertical receive), and VH (Vertical transmit, Horizontal receive). For a fully polarimetric or quad-polarization SAR system (four channels), all four combinations HH, HV, VV and VH are employed.

Generally waves can be resolved into two orthogonal components (linearly, circularly, or elliptically polarized) in the plane transverse to the direction of propagation. See, Wolfgang-Martin Boehner, "BASIC CONCEPTS IN RADAR POLARIMETRY" POLSARPRO V3.0—LECTURE NOTES, Dec. 17, 1999, http://earth.esa.int/landtraining07/polsar_basic_concepts.pdf., at page 12. The processing of different polarizations is particularly useful when metal objects are encountered. For example, a co-pol (HH or VV) response will be very high in the pixels containing a metal object's points of "left-right" symmetry. This could include multiple downrange pixels, depending on the target size and image pixel size. Such pixels could represent, for example, the centers of unexploded ordinances, and the centers of trihedrals or similar "corner-like" structures. The cross-pol response, on the other hand, will be very small in the same image pixels. It is an object of the present invention to exploit this physical phenomenon to enhance the target response from symmetric, man-made objects.

SUMMARY OF THE INVENTION

The present invention is directed to a system for detecting symmetric objects using fully polarimetric, synthetic aperture radar (SAR) imagery. The present invention can be, among other things, utilized in conjunction with co- and cross-polarization data, utilizing spatial averaging to reduce pixel variability, and exploits anomaly detection concepts associated with SAR images. The present invention exploits the underlying physics of the problem, and the initial system formulation was accomplished using electromagnetic (EM) solvers to generate "pristine" dual-pol trihedral signatures representative of symmetric, man-made objects. Close examination of synthetic data produced by electromagnetic problem solvers revealed an exploitable relationship between the co-pol (VV: transmit vertical-polarization, receive vertical-polarization) and cross-pol (VH: transmit vertical polarization, receive horizontal polarization) signatures produced by object shapes such as, for example, a trihedral. Exploitable relationships may comprise, for example a cross-pol minimum and a co-pol maximum located at the center of the trihedral (i.e., the point of left-right symmetry) in the respective SAR images. This dual-pol signature characteristic constituted a basis for development of the polarimetric manmade object detector.

Another facet of the present invention involves the optional conversion of the original image pixel values from an absolute to a relative scale. The relative scale, in turn, makes setting a detection threshold\more intuitive.

A preferred embodiment of the invention comprises a system for determining the location of a man-made object based upon symmetry of the object comprising:

a receiver configured to receive radar signals comprising cross-polarized and co-polarized responses, the co-polarized responses measured either by transmitting and receiving both horizontally polarized waves (horizontal-horizontal) or by transmitting and receiving both vertically polarized waves (vertical-vertical); the cross-polarized responses measured by either transmitting horizontally polarized waves and receiving vertically polarized waves (horizontal-vertical) or by transmitting vertically polarized waves and receiving horizontally polarized waves (vertical-horizontal);

at least one processor, the at least one processor configured to process horizontal-horizontal co-polarimetric (co-pol) data, vertical-vertical co-polarimetric data, and one or both of the vertical-horizontal cross-polarimetric data and horizontal-vertical polarimetric data to form co-polarized images and cross-polarized images;

the at least one processor configured to process the co-polarized and cross-polarized images to locate areas of interest containing a maximum in the co-pol image and a null state in the cross-pol image indicating the potential detection of a man-made object; the at least one processor being configured to filter data using buffer regions in the vicinity of an area of interest to reduce error.

A preferred method of the present invention comprises a method for determining the location of a man-made object comprising the following steps, not necessarily in order;

inputting image data comprising four co-registered polarimetric SAR images of a common scene; the four co-registered polarimetric images comprising horizontal-horizontal, horizontal-vertical, vertical-vertical and vertical-horizontal polarimetric images, the inputted image data comprising pixel values representing the polarimetric SAR images, a location in each of the four co-registered SAR images having a corresponding location in the other three co-registered SAR images; each of the four co-registered SAR images being inputted into at least one processor; the at least one processor being configured to calculate a statistic indicating the likelihood that a manmade object is present by selecting a plurality of pixels under test and using at least one processor:

determining the intensity of the background for the pixels under test by skipping a predetermined number of cross-range cells on either side of a pixel under test in the cross-pol image to calculate a background average for pixels on either side of the pixel under test;

spatial averaging at a plurality of pixel locations in the vicinity of the pixel under test to determine the background average intensity for the pixel under test;

comparing the intensity of the pixel under test with the background intensity to determine potential man-made objects.

An alternate preferred embodiment of the invention comprises system for determining the location of a man-made object based upon symmetry of the object comprising:

a receiver configured to receive radar signals comprising cross-polarized and co-polarized responses and cross pol polarimetric images;

at least one processor, the at least one processor configured to combine the horizontal-horizontal polarimetric images and vertical-vertical polarimetric images to form co-polarimetric images and operate on one or both of the vertical-horizontal polarimetric images and horizontal-vertical polarimetric images to form cross-polarized images;

the at least one processor configured to process the co-polarized and cross-polarized images to locate pixels of interest containing a maximum intensity in the co-pol image and a null state in the cross-pol image indicating the potential detection of a man-made object; the maximum intensity and null state being determined by comparing the pixels of interest with pixels in the vicinity of the pixels of interest to obtain relative intensity values; the at least one processor refining the evaluation of pixels in the vicinity of pixels of interest by using spatial averaging at a plurality of pixel locations in the vicinity of the pixels of interest and the at least one processor configured to skip a predetermined number pixels on either side of the pixel or pixels of interest before calculating the background average in order to diminish the effects of noise.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing and other objects, features, and advantages of the invention will be apparent from the following more detailed description of the preferred embodiments of the invention, as illustrated in the accompanying drawings, wherein:

FIG. 2 is an illustration showing an example of a symmetric physical target having a tetrahedral shape which was detected by the polarimetric man-made object detector to detect the left-right symmetry associated with man-made objects, FIG. 3A is an illustration showing the cross-polarimetric SAR image produced from an example man-made object represented in FIG. 2.

FIG. 3B is the co-polarimetric SAR image produced from an example man-made object represented in FIG. 2, wherein the color indicates the value (in dB) of the corresponding co-pol pixel, which has not been scaled to represent a physically meaningful quantity such as radar cross section, such that only relative comparisons should be made.

FIG. 5B is an illustration further refining the trerminology and variables utilized in FIG. 5A.

FIG. 5C is an illustration further refining the terminology and variables utilized in FIG. 5A.

FIG. 5D is an illustration further refining the terminology and variables utilized in FIG. 5A.

FIG. 5E is an illustration further refining the terminology and variables utilized in FIG. 5A.

FIG. 6 is a graphical illustration showing exceedance plots in relation to clutter background for scenario 1 produced in accordance with the principles of a preferred embodiment of the present invention.

Figure 1:
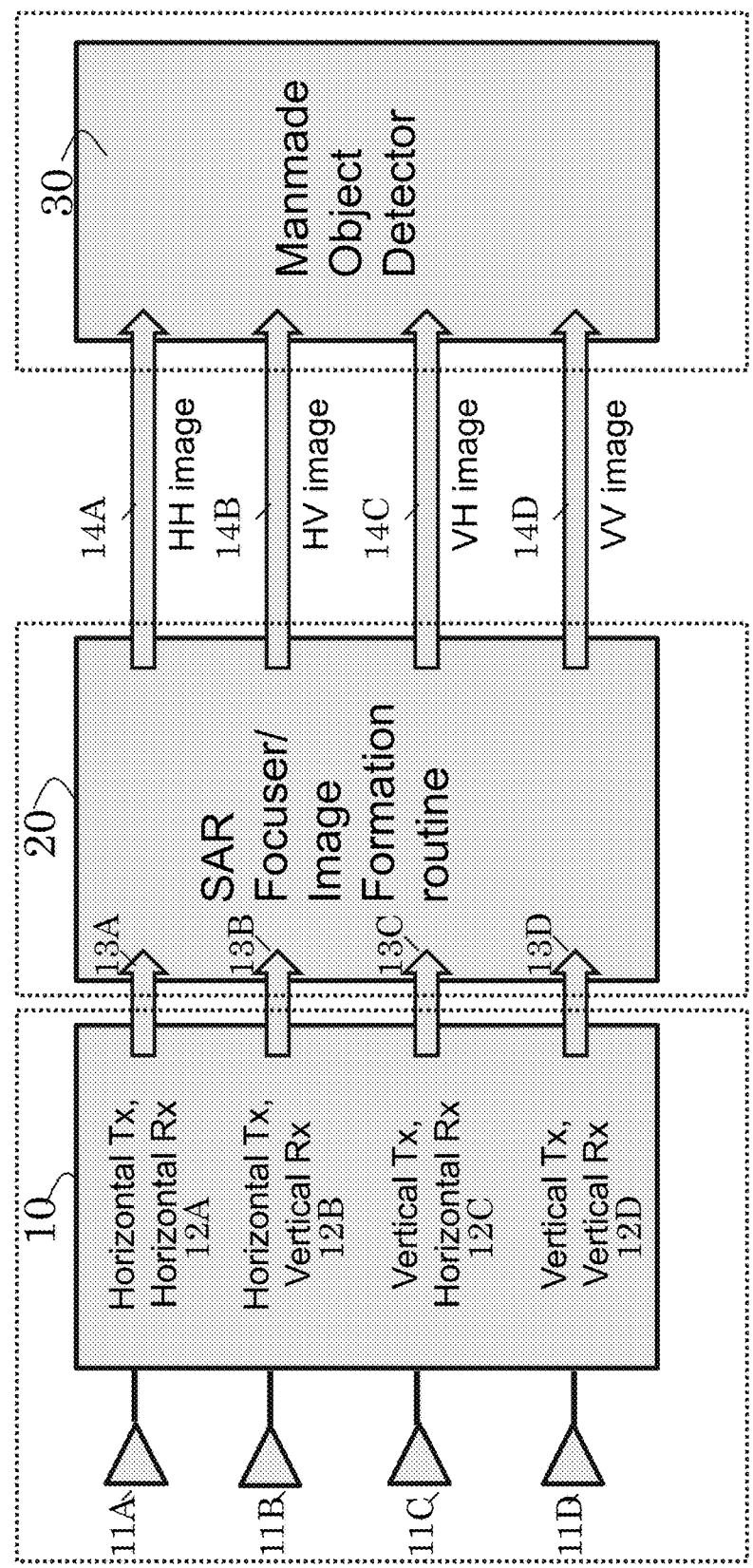
FIG. 1 is a schematic overview of inputs, elements, and software components utilized in conjunction with a man-made object detector 30 in accordance with the principles of the present invention.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DESCRIPTION OF THE PREFERRED EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention. Rather, these embodiments are provided so that this disclosure will be thorough and complete, and will fully convey the scope of the invention to those skilled in the art. In the drawings, the dimensions of objects and regions may be exaggerated for clarity. Like numbers refer to like elements throughout. As used herein the term "and/or" includes any and all combinations of one or more of the associated listed items.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that the terminology left-right or left right is based upon the orientation of the image and that if the image is rotated 90 degree, left right symmetry will appear as up and down symmetry. As used herein, pixels to the side of the pixel under test are those pixels appearing adjacent to the pixel in the left right direction (or if rotated 90 degrees, then in the up and down direction).

It will be understood that, although the terms first, second, etc. may be used herein to describe various elements, these elements should not be limited by these terms. For example, when referring first and second components, these terms are only used to distinguish one component from another component.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Some alternative approaches increase the number of available SAR images by breaking the synthetic aperture into several sub-apertures, each sub-aperture producing a corresponding image of the scene. While increasing the number of images available for averaging, this approach has the side-effect of reducing the resolution in each of the new images. In addition it could also corrupt the inherent symmetry of a target object if too much squint is introduced within some of the sub-apertures. Still other methods proposed in the past combine the SAR images from each polarization channel (i.e. co-pol and cross-pol) to create a single image for use by downstream target detection algorithms. Such approaches have been leveraged to detect larger, tactical targets in high resolution imagery. While achieving optimum performance in terms of a specific measurement criterion, they fail to exploit the very explicit co-pol to cross-pol relationship present in symmetric, man-made objects.

The preferred embodiment man-made object detection system (PMOD) differs from the current state of the art in several respects. First, it operates on a full-aperture SAR image, thereby maintaining the highest possible underlying image resolution. Second, it utilizes the complex magnitude of each component image pixel, thereby enabling the exploitation of spatial averaging for speckle reduction. Finally, it leverages the fundamental concepts of anomaly detection to "amplify" the signal from symmetric, man-made targets while leaving signals from asymmetric, natural clutter objects essentially unchanged. This results in a greater contrast between target and non-target objects within the scene.

Figure 5A:
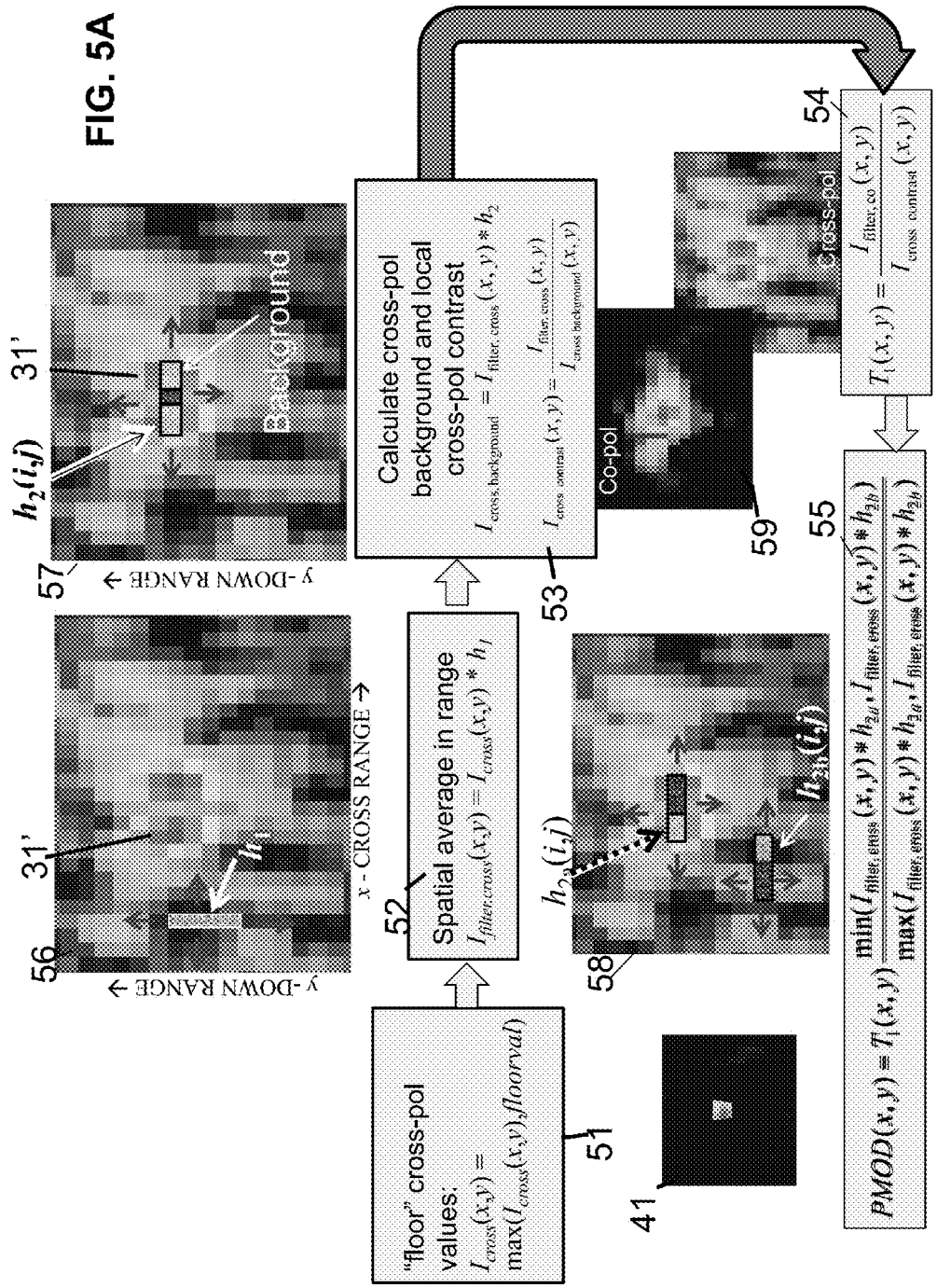
FIG. 5A depicts the processing steps of a polarimetric manmade object detector (PMOD) algorithm, including the calculation stages for signature enhancement achieved by a preferred embodiment of the present invention.

The preferred embodiment of the present invention builds upon the fundamental PMOD architecture to create a system that reduces the number of false alarms at a given probability of detection. FIG. 5A depicts a block diagram of the polarimetric manmade object detector (PMOD) algorithm.

The invention comprises the novel combination of multiple physics-based target detection features in a system tailored to detect symmetric targets. The new feature definitions leverage both the original SAR images (co-pol and cross-pol) as well as the enhanced image produced by the PMOD system of U.S. patent application Ser. No. 14/563,270. Other systems often rely on trained detection algorithms (e.g., neural nets, support vector machines, polynomial detectors, etc.) to calculate a decision statistic that is effective against a wide variety of target types. The preferred embodiment system of the present invention however, directs attention to targets exhibiting left-right symmetry. This significantly reduces the number of target detection features and "trained" algorithm parameters required. It also enables the system to reduce a large number of potential false alarms while operating at a desired probability of detection. In addition, the preferred embodiment system expresses target likelihood in relative (i.e., local) rather than absolute (i.e., global) terms. Hence, a pixel is classified as "target" if it exceeds the local background by a certain number of dB—an intuitively pleasing way to set a threshold. Finally, the proposed system does not require a large number of parameters to be determined through training.

FIG. 1 is a schematic block diagram of a preferred embodiment polarimetric manmade object detection system. The preferred embodiment synthetic aperture radar sensor produces imagery having sufficient down-range and cross-range resolution to ensure that one image pixel encompasses the target's point of left/right symmetry without including contributions from non-target objects. The synthetic aperture radar images—collected simultaneously at different polarizations—contain information regarding the polarization state of the target. A preferred embodiment enhances target signatures by combining of co-polarimetric (VV and HH) and cross-polarimetric (HV and VH) radar data using co-polarimetric and cross-polarimetric radar images.

The polarimetric SAR receiver 10 comprises four input/output receiver/transmitters or "basis" channels 11A to 11D for inputting data into SAR receiver sections 12A through 12D through to the SAR processor 20. The data may be fully polarimetric and includes (A) horizontal antenna transmitted data which was received by a horizontal receiver antenna data (shown as horizontal Tx horizontal Rx in FIG. 1) transmitted and received at 11A, (B) horizontal antenna transmitted data which was received by a vertical receiver antenna data (shown as horizontal Tx vertical Rx in FIG. 1) transmitted and received at 11B, (C) vertical antenna transmitted data which was received by a horizontal receiver antenna data (shown as vertical Tx, horizontal Rx in FIG. 1) transmitted and received at 11C and (D) vertical antenna transmitted data which was received by a vertical receiver antenna data (shown as vertical Tx, vertical Rx in FIG. 1) transmitted and received at 11D. The synthetic aperture radar sensor produces imagery of high enough down-range and cross-range resolution to ensure that one image pixel encompasses the target's point of left/right symmetry without including contributions from non-target objects. The synthetic aperture radar images—collected simultaneously at different polarizations (A-D) contain information regarding the polarization state.

Continuing with the representations shown in FIG. 1, the inputted data is focused to produce four co-registered SAR images 12A-12D of a common scene, wherein a specified pixel value represents the radar cross section (RCS) of the same patch of ground in each of the four basis polarizations. The four images are then inputted through channels 14A-14D to the polarimetric manmade object detector 30, which calculates a statistic indicating the likelihood that a manmade object is present. The polarimetric manmade object detector 30 calculates a statistic indicating the likelihood that a manmade object is present.

FIG. 2 illustrates an example of a man-made object 31 having a symmetrical shape which was detected by the polarimetric manmade object detector to detect the left-right symmetry indicative of manmade objects. Objects displaying such symmetry include, among other things, spheres, ellipsoids and trihedrals.

FIG. 3A is an image of the trihedral under consideration (represented in FIG. 2) processed by the SAR image formation software. The color scales are set relative to the maximum pixel value in the image. FIG. 3B is the co-polarimetric image produced by the SAR image formation software of the manmade object detector component 30. The color scales are set relative to the maximum pixel value in the image. Note the region of lower radar cross section in the cross-pol image. In FIGS. 3A and 3B, the color indicates the value (in dB) of the corresponding cross-pol pixel, which has not been scaled to represent a physically meaningful quantity such as radar cross section. The pixel value, however, remains proportional to the cross-pol reflectivity of the target; hence, relative comparisons can be made. The target (trihedral) signature (or area of interest) comprises the center pixels in the image, and the characteristic cross-pol symmetry feature is evident. It consists of the larger-valued orange and red pixels together with the smaller-valued, light blue pixels between them. (Note the left-right symmetry of this characteristic target signature.) The smaller-valued pixels are referred to as "nulls," since they are surrounded on either side by larger-valued pixels. According to theory, these pixels—located at the point of left-right symmetry—should actually be zero, in which case they would truly have a null value. For the measured data, however, note that the "null" is 15 to 20 dB below the largest target pixel, and this is sufficient for exploitation by the preferred embodiment of the system.

Each image shown in FIGS. 3A and 3B is formed of pixels. The target (or area of interest), background, and guard regions (in FIG. 4) are selected based on the size and characteristics of the target response. Examples of regions for Box 44 would be: (i) target region: 1 pixel, background region: 5 pixels (on each side), and (iii) guard region 2 pixels (on each side). Examples of regions for box 45 could be: (i) target region: a 5×5 box of pixels for each "half" of the target region, separated from each other by a 3×5 rectangle of pixels (where the cross-range dimension is the first dimension, which is 3 for the rectangle), (ii) background region: the pixels contained in a 41×31 rectangle after the center 21×15 rectangle of pixels has been removed, and (iii) guard region: the pixels within the center 21×15 rectangle of pixels, excluding the target region. Examples of regions for box 46 could be: (i) target region: a 3×3 box, (ii) background region: the pixels in a 25×11 box centered (in cross-range)

at the target location and located such that its leading edge is 2 pixels behind the target region (i.e., 2 pixels farther in down-range), and (iii) guard region: the remaining pixels in the 25×25 box that are not part of the target and background regions. These would only be considered examples, and they could change depending on the target (or area) of interest.

The background regions generally are not the same in all cases (for $f_1$, $f_2$, and $f_3$). This can be understood as follows. Consider, for example, $f_1$, the equation for which is depicted in Box 44 of FIG. 4. In this case, all of the regions used to calculate $f_1$ should fall on the target. In particular, the background region is selected to capture the "bright" regions on either side of the target null while the target region should capture the target null. For feature $f_2$, the equation for which is depicted in Box 45 of FIG. 4, the two target regions are selected to capture the bright regions on either side of the target null, and the background region is selected to be far enough away from the target so as not to include any target pixels. (Energy from the target response could "spill over" into adjacent image pixels.) The background region will be larger for feature $f_2$ in an effort to obtain a more accurate estimate of the background clutter. The pixel sizes are determined by the imaging parameters and are typically on the order of 2.5 to 5 cm on a side. The target size will, therefore, determine the number of pixels required for each region. These are all "sample" values.

The SAR images shown in FIG. 3A and 3B reveal that the radar cross section in the cross-polarimetric image drops suddenly at the pixel with cross-range coordinate encompassing the left-right point of symmetry (shown generally as 31). This effect is exploited by the polarimetric manmade object detector 30 to detect symmetric objects. While HH (horizontal Tx and horizontal Rx) and HV (horizontal Tx and vertical Rx) are used to illustrate the co-pol and cross-pol channel behaviors, similar co- and cross-pol behavior will be observed in the VV (vertical Tx and vertical Rx) and VH (vertical Tx and horizontal Rx) channels. Referring to FIG. 3B, the target signature again comprises the middle pixels, which are primarily light blue to red. Unlike the cross-pol signature, the center pixels of the co-pol target signature are large (orange to red). In particular, the largest co-pol values occur in the vicinity of the cross-pol "null" (i.e. the low cross-pol pixel values between the high cross-pol pixel values). These observations are exploited by the preferred embodiment of the system.

Figure 4:
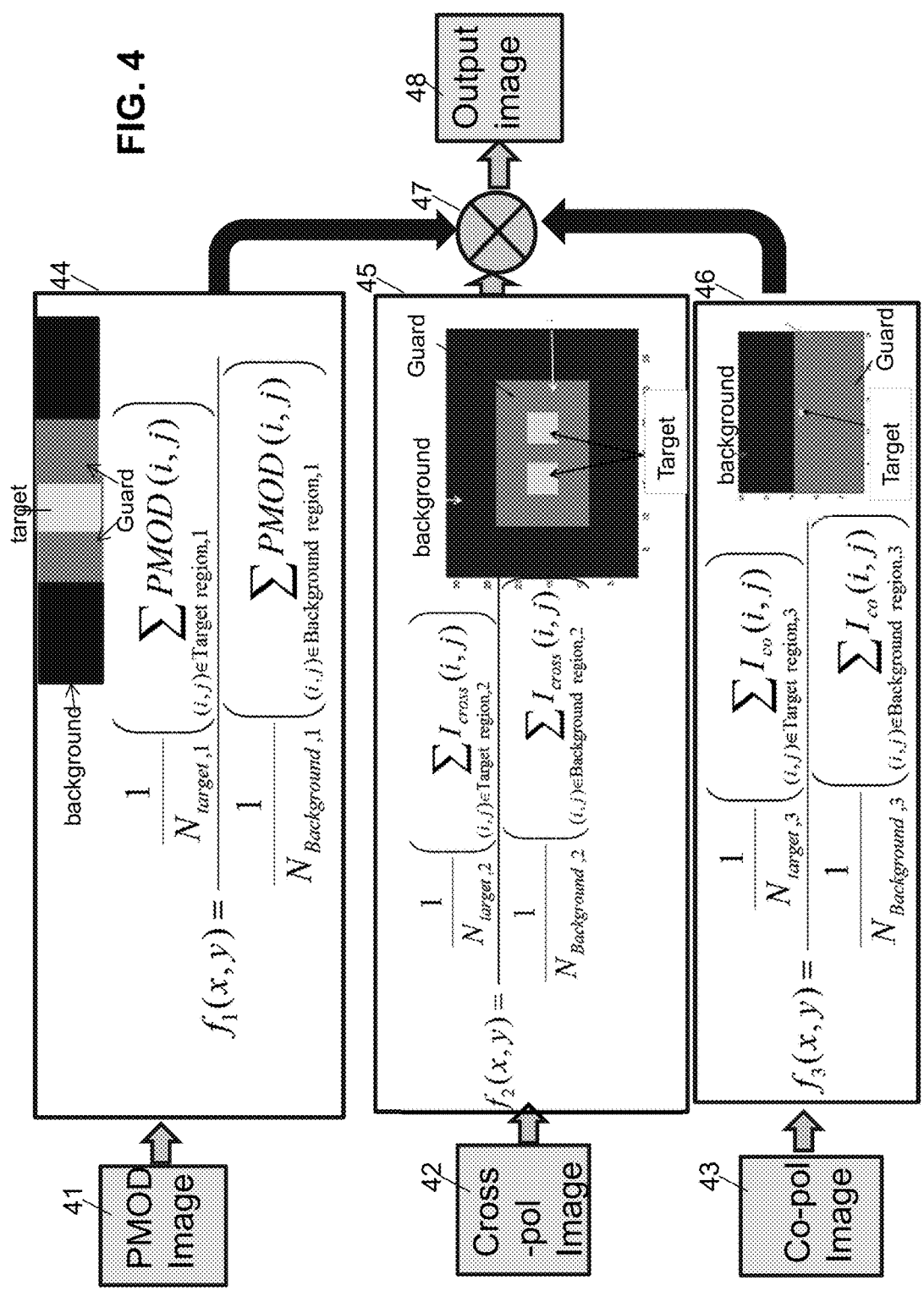
FIG. 4 is an illustration depicting the components PMOD image 41, cross-pol image 41 and co-pol image 43 that are inputted into a multiplier so as to create the output image.

FIG. 4 illustrates the image components utilized in polarimetric man-made object detection in accordance with the principles of the present invention. The images in blocks 42 and 43 represent co-pol and cross-pol SAR images of scenes that may include symmetric targets such as the one depicted in FIG. 3A and 3B. The image produced by the polarimetric manmade object detector (PMOD) algorithm is the output image produced by the process outlined in FIG. 5A. Data is collected from specially designed target detection "features" (detection statistics) calculated from all available imagery (i.e., the PMOD image, the co-pol image, and the cross-pol image).

As described in application Ser. No. 14/563,270, entitled "Method and System for Detecting Man-made Objects Using Polarimetric Synthetic Aperture Radar Imagery," the preferred methodology reduces the value of the cross-pol pixel at the point of symmetry through normalization by stronger cross-pol values on either side of the point of symmetry. Finally, the polarimetric manmade object detector (PMOD) algorithm divides the co-pol pixel value (which is typically high for metallic, symmetric, man-made objects) by this reduced co-pol pixel value. In regions where left-right symmetry exists, the co- to cross ratio should tend to be higher. As used herein, the coordinate x refers to cross-range and the coordinate y refers to down-range, and these coordinates (pixel locations) are denoted (x,y). These steps can be summarized as:

Select one co-pol channel (either HH or VV) and one cross-pol channel (either HV or VH) (see FIG. 1) for use by the polarimetric manmade object detector (PMOD) processor 30.

(ii) As depicted in Box 51, Create a new cross-pol image from the input cross-pol image according to the formula: $I_{cross}(x,y)=\max(I_{cross}(x,y)\text{floorval})$, where x and y denote image indices, $\max(I_{cross}(x,y)\text{floorval})=I_{cross}(x,y)$ if $I_{cross}(x,y)>\text{floorval}$ and $\max(I_{cross}(x,y), \text{floorval})=\text{floorval}$, otherwise. Here, floorval is determined experimentally.

(iii) Determine the number of down-range cells, $N_p$, for use in spatial averaging for polarization p=0 (co-polarimetric) and p=1 (cross-polarimetric), and perform spatial averaging at each pixel location according to:

$$I_{filter}(x, y) = \sum_{i=0}^{N_p} I(x, y - \lfloor N_p/2 \rfloor + i), \quad (1)$$

where I(x,y) denotes the image (either HH, VV, HV, or VH) pixel at (x,y), and $\lfloor Np/2 \rfloor$ denotes the largest integer less than or equal to Np/2., where Np could be equal to one for the co-polarimetric image. (If $N_p=1$, then no filtering is performed.) This operation is depicted in 56 by a convolution with the column vector, $f_1$ whose entries are all 1.

(iv) specify, M, the number of cross-range cells on either side of a pixel under test (PUT) in the cross-pol image used to capture radar cross section levels (i.e., a background average) for pixels without left-right symmetry. Specify m, the number of "guard" cells on either side of the pixel under test to be "skipped" before calculating this background average, which could be equal to zero. For each pixel in the filtered cross-pol image, calculate the quantity:

$$I_{cross,background}(x, y) = \sum_{i=m+1}^{M} I_{filter,cross}(x-i, y) + \sum_{i=m+1}^{M} I_{filter,cross}(x+i, y), \quad (2)$$

where, $I_{filter, cross}$ is the filtered cross-pol image. This operation is depicted in Box 57 by convolution with the row vector $f_2$, whose entries are 0 where "black" and 1 otherwise.

(v) For each pixel in the cross-pol image calculate the quantity (Box 38 of Ser. No. 14/563,270; similar to Box 53):

$$I_{cross\ contrast}(x, y) = \frac{I_{filter,cross}(x, y)}{I_{cross,background}(x, y)} \quad (3)$$

[Note that a large cross denominator is indicative of high intensity pixels in the area, which are in turn indicative of manmade object.]

(vi) Calculate the polarimetric manmade object detector (PMOD) output statistic (Box 39 of Ser. No. 14/563,270; similar to Box 54) as:

$$T_{PMOD}(x, y) = \frac{I_{filter,co}(x, y)}{I_{cross\ contrast}(x, y)}, \quad (4)$$

where $I_{filter,\ co}(x,y)$ denotes the filtered co-pol image, and $I_{filter,co}(x,y)$ may (and usually does) equal $I_{co}(x,y)$.

(vii) Calculate an additional symmetry constraint and apply according to:

$$T_{PMOD,modified}(x, y) = \\ T_{PMOD}(x, y) \frac{\min(I_{filter,cross}(x, y) * h_{2a}, I_{filter,cross}(x, y) * h_{2b})}{\max(I_{filter,cross}(x, y) * h_{2a}, I_{filter,cross}(x, y) * h_{2b})},$$

where $I_{filter,\ cross}(x,y)*f_{2a}$ denotes convolution of $I_{filter,\ cross}(x,y)$ and $f_{2a}$. These convolution operations reduce to the following for location (x,y):

$$I_{filter,cross}(x, y) * f_{2a} = \\ \sum_{i=m+1}^{M} I_{filter,cross}(x-i, y) \text{ and } I_{filter,cross}(x, y) = \sum_{i=m+1}^{M} I_{filter,cross}(x+i, y)$$

Note that the output of the convolution with $h_{2a}$ corresponds to the left half of the sum in (2), while the convolution in $h_{2b}$ corresponds to the right half of the sum in (2). That is, $h_2=h_{2a}+h_{2b}$. If both halves of the background sum are nearly equal, then the scale factor becomes close 1. Note that the notation PMOD(x,y) refers to the result of the polarimetric manmade object detector (PMOD) algorithm which is also referred to as $T_{PMOD,modified}(x,y)$ or in mathematical terms, PMOD $(x,y)=T_{PMOD,\ modified}(x,y)$.

(viii) Process the image (two-dimensional array) of PMOD values to determine if the object under investigation is man-made.

Following creation of the (modified) PMOD image 41, the features used by the preferred embodiment system are calculated as illustrated in FIG. 4. In formulating the first feature definition ($f_1$ in box 44 of FIG. 4), it is noted that the cross-range PMOD signature exhibits some very specific spatial relationships for the (man-made) targets of interest. Referring to Box 44, first, the PMOD value is, by design, large at the point of left-right symmetry (i.e. at the "center" of the target). Secondly, the PMOD definition makes it likely that, for targets of interest, the PMOD value will be small at locations some distance to the left and right of the symmetry point. This is relatively easy to understand from the block diagram and SAR imagery in FIG. 5 together with the block diagram (and equation) shown in FIG. 4. It has been observed that the cross-pol pixel values to the left and right of the symmetry point become larger while the corresponding co-pol pixel values become smaller. This leads to a significant decrease in the PMOD values at these pixel locations. The first feature, $f_1(x,y)$, exploits this target signature behavior by calculating the local contrast expressed by the equation for $f_1$ at pixel location (x,y) in Box 44 of FIG. 4, wherein.

$$f_1(x, y) = \frac{\frac{1}{N_{target,1}}\left(\sum_{(i,j)\in Target\ region,1} PMOD(i, j)\right)}{\frac{1}{N_{Background,1}}\left(\sum_{(i,j)\in Background\ region,1} PMOD(i, j)\right)}$$

where $N_{target,1}$=the number of pixels in Target region 1, and $N_{Background,1}$=the number of pixels in Background region 1 as illustrated in Box 44 of FIG. 4. It is noted that this operation (Box 44) has converted the PMOD value from a global scale to a local (relative) scale. In Box 45 the second feature, $f_2(x,y)$, is calculated from the cross-pol image as follows:

$$f_2(x, y) = \frac{\frac{1}{N_{target,2}}\left(\sum_{(i,j)\in Target\ region,2} I_{cross}(i, j)\right)}{\frac{1}{N_{Background,2}}\left(\sum_{(i,j)\in Background\ region,2} I_{cross}(i, j)\right)}$$

where $N_{target,2}$=the number of pixels in Target region 2, and $N_{Background,2}$=the number of pixels in Background region 2 as illustrated in Box 45 of FIG. 4. Lastly, in Box 46, the third feature, $f_3(x,y)$, is calculated from the co-pol image as follows $$f_3(x, y) = \frac{\frac{1}{N_{target,3}}\left(\sum_{(i,j)\in Target\ region,3} I_{co}(i, j)\right)}{\frac{1}{N_{Background,3}}\left(\sum_{(i,j)\in Background\ region,3} I_{co}(i, j)\right)}$$

where $N_{target,3}$=the number of pixels in Target region 3, and $N_{Background,3}$=the number of pixels in Background region 3 as illustrated in Box 46 of FIG. 4.

The definition of a second feature begins with a "template match" to the target cross-pol signature calculated at each pixel location, (x,y). The output of this operation is then compared with the average of cross-pol pixels selected from a suitable "background" region. As with Feature 1 (calculation of $f_1(x,y)$), both the target and background templates are shown in FIG. 3. Since the cross-pol target response is likely to be larger than the associated cross-pol background response, Feature 2 (calculation of $f_2(x,y)$) will tend to "amplify" the target response when incorporated as part of the overall target detection system.

Feature 3 (calculation of $f_3(x,y)$) attempts to exploit shadowed regions (behind a target) within the co-pol imagery. It calculates a measured local contrast using the target and background templates indicated in FIG. 3. Once again, a feature value is calculated at each pixel location according to the equation for $f_3(x,y)$ in box 46 of FIG. 3. As with Feature 2, this optional feature should provide additional target gain relative to non-target pixel values under certain situations. It is noted that incorporation of all three features is not required. Depending on the clutter background, the use of only two features may be preferred.

The outputs of Boxes 44, 45, and 46 are then multiplied together as depicted by the multiplication operation to create a new image, wherein the pixel value at coordinate (x,y) is simply the product of the values at the same coordinate in $f_1,f_2,$ and $f_3$. Note that it is also possible to multiply together only a subset of all features, e.g., only $f_1$ and $f_2$. The values of these pixels are then analyzed to determine whether or not a target is present. One possible decision method may declare a target to be present at (x,y) if the pixel value is greater than 15.

FIG. 5A depicts a block diagram of the polarimetric manmade object detector (PMOD) algorithm, used as part of the calculation of the first feature. From the diagrams, the polarimetric manmade object detector (PMOD) algorithm first performs a "flooring" operation that sets all cross-pol values less than floorval equal to floorval. Specifically, the output of this operation are shown as $I_{cross}(x,y)=\max(I_{cross}(x,y),\text{floorval})$ in block 51, where the function $\max(x,y)=x$ if $x>y$ and $\max(x,y)=y$ if $y>x$, and floorval may be an experimentally determined value. This step is performed to eliminate potential false alarms due to unreasonably small pixel values from clutter regions that would not normally be confused with targets. Such pixel values could skew the results of the PMOD calculation.

In the block diagram of FIG. 5A, $h_2$, $h_{2a}$, $h_{2b}$ are defined as:

$$h_2(i, j) = \begin{cases} 1, 1 \le i < M \\ 0, i < M \\ 1, M < i \le 2M+1 \end{cases}, h_{2a}(i, j) = \begin{cases} 1, 1 \le i < M \\ 0, M \le i \le 2M+1 \end{cases},$$

$$h_{2b}(i, j) = \begin{cases} 0, 1 \le i \le M \\ 1, M < i \le 2M+1 \end{cases} \text{ and } h_2(i, j) = h_{2a}(i, j) + h_{2b}(i, j)$$

The "floor value" may be an experimentally determined value such that cross-pol values less than floor value are set equal to the floor value. The functions $h_2$, $h_{2a}$ and $h_{2b}$ defined above are effective in the reduction of image artifacts. This is especially evident in the vicinity of "bright" targets producing appreciable sidelobes.

Referring to FIG. 5A, in Box 51, cross-pol image pixel values less than the "floor" cross-pol value are set equal to the floor value ($I_{cross}(x,y)=\max(I_{cross}(x,y),\text{floorval})$). Box 52 spatially averages or smooths, the cross-pol image to ensure that extremely low, isolated pixel values do not bias the ratio calculated in Box 53. Specifically in Box 52 the spatial average in range is determined using the equation $I_{filter,cross}(x,y)=I_{cross}(x,y)*h_1$, where "*" denotes 2D convolution. (Note that the convolution operation is described in equation (1)) The averaging window is a column vector, where each column represents a particular cross-range location. This configuration is selected because the cross-range extent of the characteristic null can be on the order of one pixel and it is undesirable to degrade the contrast between null and non-null pixels in the cross-range dimension. The cross-pol image 56 shows a target 31' and a representative $h_1$. For target pixels (specifically, locations about which there is left-right symmetry), Box 53 produces a measure of the contrast between the null pixels and the pixels on either side of it. The cross-pol image 57 shows a target 31' and a representative background filter $h_2(i,j)$. As shown in Box 53; the cross-pol background and local cross pol contrast is determined using the following equations/operations $$I_{crossbackground} = I_{filter,cross}(x,y)*h_2 \text{ and } I_{cross\,contrast}(x,y) = \frac{I_{filter,cross}(x,y)}{I_{crossbackground}(x,y)},$$

where "*" once again denotes 2D convolution. The 2D convolution in the calculation of $I_{crossbackground}$ is described by equation (2) and the associated description, where the length of filter $h_2$ is 2M+1, and m is the number of cells on each side of the input pixel that are excluded from the background calculation. This region is commonly referred to as a "guard region" in the detection theory literature. This value of m is equal to 0 for the preferred embodiment. The ratio will be the smallest when the contrast between the null and non-null pixels is largest—the inverse of a usual contrast measure indicating the presence of a target. If a target is present, this large co-pol value will be amplified by the amount of contrast between the null and local background pixels. In Box 54, $T_1(x,y)=I_{filter,co}(x,y)/I_{cross,\,contrast}(x,y)$ is calculated. Here, $I_{filter,co}$ denotes a spatially filtered version of the co-pol image. This is often simply equal to the co-pol image itself; namely $I_{filter,co}=I_{co}$. In Box 55, the ratio is determined:

$$PMOD(x, y) = T_1(x, y) \frac{\min(I_{filter,cross}(x, y)*h_{2a}, I_{filter,cross}(x, y)*h_{2b})}{\max(I_{filter,cross}(x, y)*h_{2a}, I_{filter,cross}(x, y)*h_{2b})}.$$

Certain boxes in FIG. 5A mitigate false alarms produced by specific phenomena with the images. For example, Box 55 containing the equation $$PMOD(x, y) = T_1(x, y) \frac{\min(I_{filter,cross}(x, y)*h_{2a}, I_{filter,cross}(x, y)*h_{2b})}{\max(I_{filter,cross}(x, y)*h_{2a}, I_{filter,cross}(x, y)*h_{2b})}$$

reduces the contribution from scene locations that exhibit the characteristic cross-pol null flanked by 2 "bright" regions on either side without the requisite symmetry between these two high intensity halves. In this case, the cross-pol pixel values on one side of the null are larger, on average, than those on the other side. When such asymmetry is present then the output of Box 54 is multiplied by a quantity less than 1. Box 51 has been incorporated to eliminate false alarms due to low-intensity, noise-like pixels within the cross-pol image. The presence of the floor (floor value references above) reduces contrast due to unreasonably small pixel values.

FIG. 5B is an illustration further refining the terminology and variables utilized in FIG. 5A. Box 61 provides definitions of the pixel designations for the cross-polarized and co-polarized image pixels. Box 62 contains an explanation of the equation $I_{cross}(x,y)=\max(I_{cross}(x,y),\text{floorval})$, where x and y denote image indices, $\max(I_{cross}(x,y),\text{floorval})=I_{cross}(x,y)$ if $I_{cross}(x,y)>\text{floorval}$ and $\max(I_{cross}(x,y),\text{floorval})=\text{floorval}$, otherwise. floorval may be determined experimentally. Box 63 provides a definition for $h_1$ in equation and graphical forms. Box 64 provides a definition for $h_2$ in equation and graphical forms. Box 65 provides a definition of $T_1$ ($T_{PMOD}$) where $$T_{PMOD}(x, y) = \frac{I_{co,filtered}(x, y)}{I_{cross\,contrast}(x, y)}.$$

FIG. 5C is an illustration further refining the terminology and variables utilized in FIG. 5A. A continuation of Box 65 provides additional explanation of $T_1$ ($T_{PMOD}$). Box 66 provides an explanation for the polarimetric manmade object detector PMOD equation $$PMOD(x, y) = T_1(x, y) \frac{\min(I_{filter,cross}(x, y)*h_{2a}, I_{filter,cross}(x, y)*h_{2b})}{\max(I_{filter,cross}(x, y)*h_{2a}, I_{filter,cross}(x, y)*h_{2b})}.$$

Figure 7:
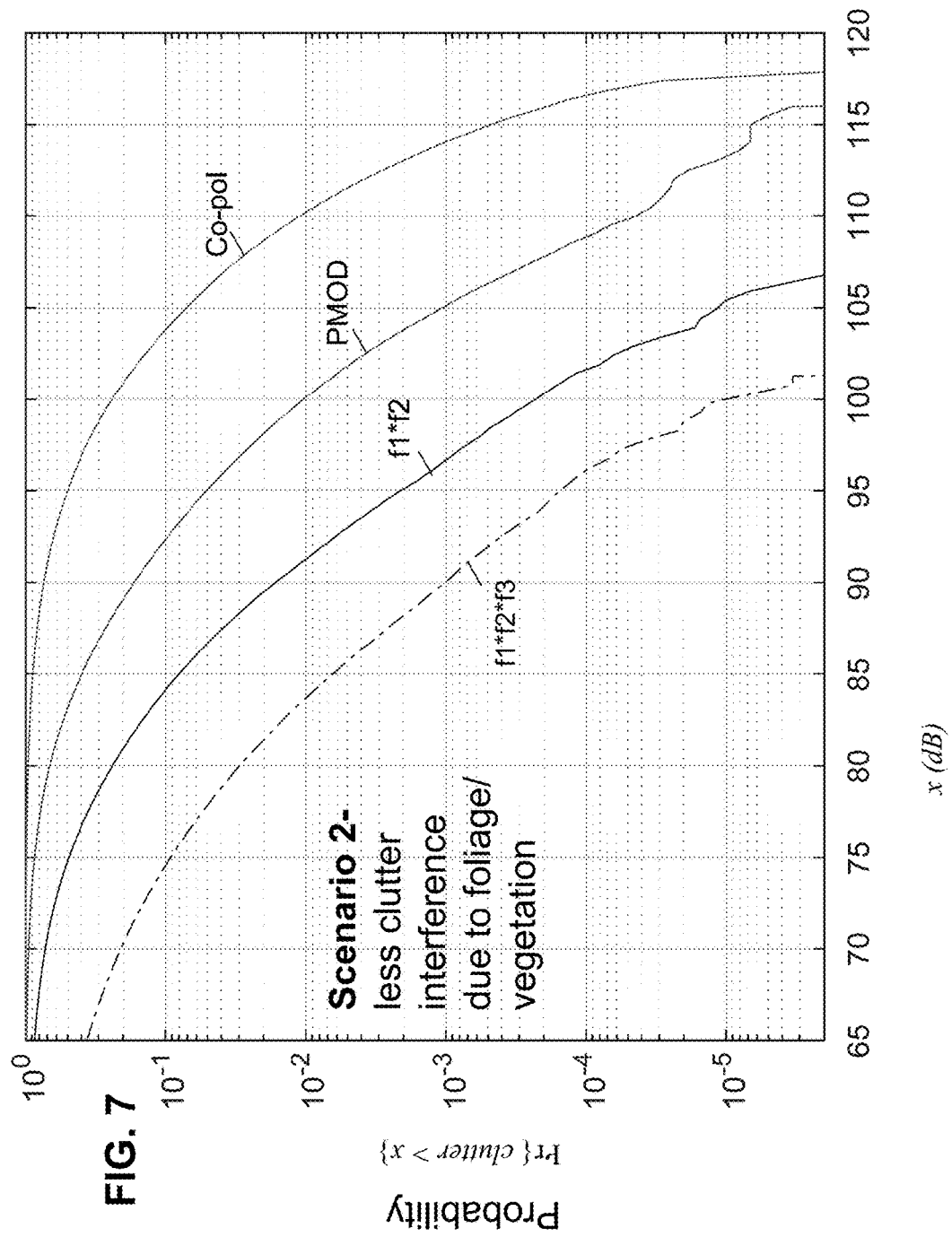
FIG. 7 is a graphical illustration showing exceedance plots for a preferred embodiment of the present invention in relation to a different clutter background relative to scenario 1 in FIG. 6; wherein for a target value of 100 dB, the proposed three-feature system (using $f_1 f_2 f_3$) realizes an improvement in performance (i.e., reduction in $P_{fa}$) greater than four orders of magnitude relative to the original co-pol imagery.
Figure 8:
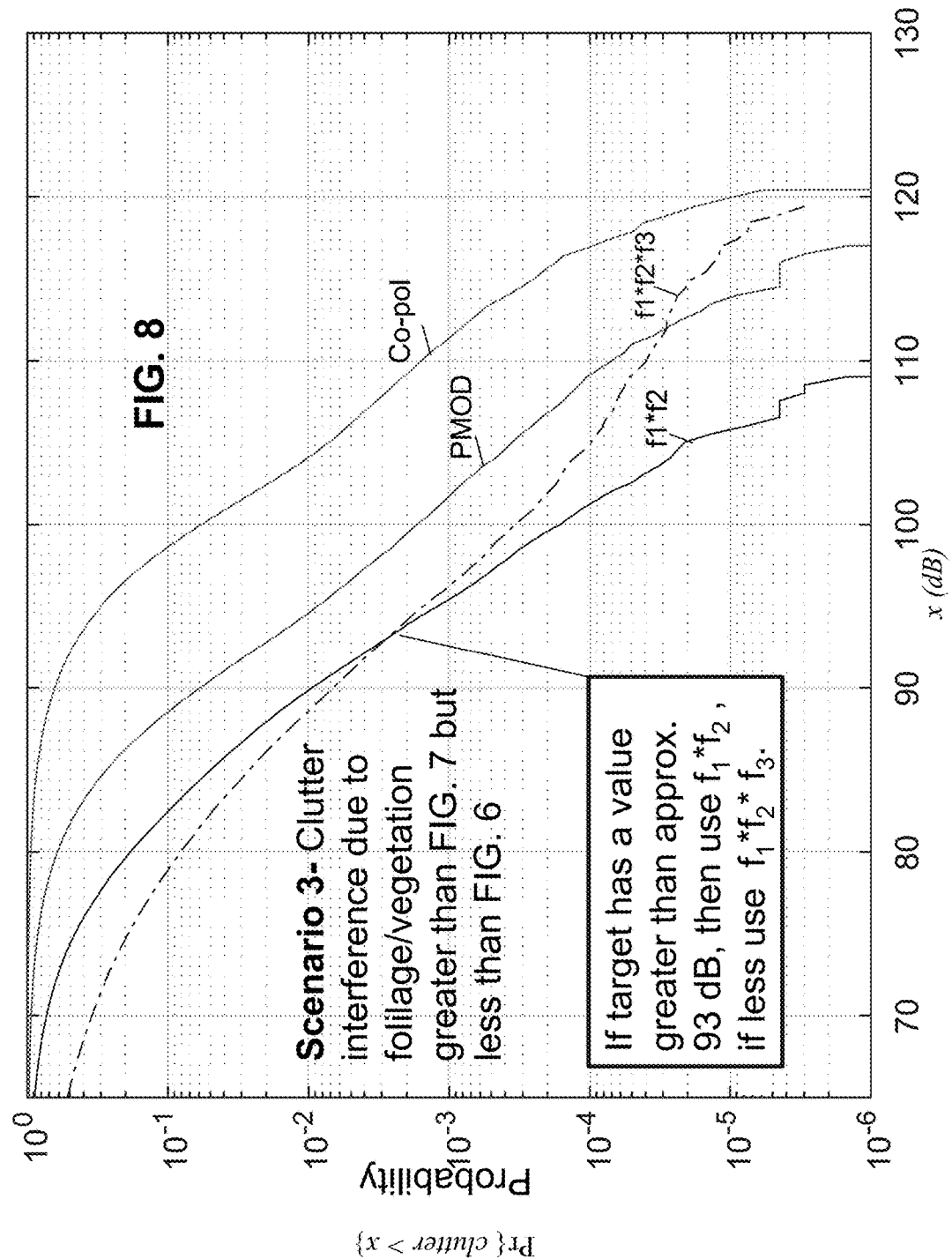
FIG. 8 is a graphical illustration showing exceedance plots for a preferred embodiment of the present invention in relation to a different clutter background relative to scenarios 1 and 2 in FIGS. 6 and 7.

FIG. 5D is an illustration further refining the terminology and variables utilized in FIG. 5A; and more specifically the determination of $f_1$, which correlates to feature 1 illustrated in Box 44 of FIG. 4 and which is used in association with two of the curves in the graphs of FIGS. 6-8.

FIG. 5E is an illustration further explaining the usage of spatial averaging in conjunction with the co-polarized image, Typically, the number of pixels skipped is zero which results in the elimination of the filtering step shown by FIG. 5E Alternative SAR systems rely on the calculation of specific statistics produced by transformation of the underlying polarization states. For example, the asymmetry angle produced by polarimetric decompositions may be utilized for detection of symmetric objects in a SAR image. The value of this statistic is compared to expected values for man-made objects, and a decision is made as to whether or not a target is present in the scene. Such a method, however, is not inherently amenable to spatial averaging (i.e. speckle reduction). Hence, it is subject to the high variability commonly encountered in SAR image pixel values.

The effectiveness of the preferred embodiment system is illustrated by the plots of exceedance curves found in FIGS. 6-8. These curves display the fraction of clutter pixel values exceeding a given value, these pixel values being expressed in a logarithmic scale (i.e., "decibels," or "dB"). To normalize the pixel values across all detector configurations, the same target is defined to have the same maximum pixel value, regardless of the feature-set used to derive it. The remaining pixel values are then scaled by the factor required to force the maximum target pixel value to this specified value. FIG. 6 shows exceedance curves for the original co-pol image, the (modified) PMOD image, the detection image calculated using only two features, and the detection image calculated using all three features in relation to clutter background for scenario 1 utilizing a preferred embodiment of the present invention. The fraction of clutter samples competing with the targets has decreased by approximately two orders of magnitude following the incorporation of the new system using two features, and this is true over a wide range of values for x. Referring to FIG. 6, exceedance plots for the preferred embodiment system, the top col-pol curve represents the original co-pol image data, the PMOD (Polarmetric Object Detector) curve represents the (modified) PMOD, and the $f_1(x,y) f_2(x,y)$ curve represents the product of feature 1 and feature 2; as utilized in conjunction with a preferred embodiment of the present invention The $f_1(x,y) f_2(x,y) f_3(x,y)$ curve (Feature 1) (Feature 2) (Feature 3), representing the product of feature 1, feature 2 and feature 3; as utilized in conjunction with a preferred embodiment of the present invention, is depicted by the black dash-dot curve. By way of example, consider an x value (i.e. a clutter or target value) of 100 dB. The curve labelled co-pol, read above the 100 dB delineator, using a logarithmic scale, indicates that approximately 70% of the clutter pixels in the co-pol image are above this value. Hence, in order to detect a target with a co-pol target intensity of 100 dB, it would be necessary to tolerate a probability of false alarm ($P_{fa}$) of 0.7 (or 70% probability). Using only the PMOD (depicted by the curve labelled PMOD) reading the graph at 100 dB, the $P_{fa}$ is lowered to approximately 0.09. That is a probability that only 9% of PMOD pixel values attributable to clutter are greater than 100 dB for this clutter background scenario. Similarly, by using the proposed two-feature system (depicted by the curve in the FIG. 6 by the label $f_1f_2$) the $P_{fa}$ or probability of the pixel values are attributable to clutter is lowered even further to approximately 0.001. Finally, when using the proposed three-feature formulation (depicted in FIG. 6 by the curve labelled $f_1f_2f_3$), the probability of that the pixel values at 100 dB are attributable to clutter or $P_{fa}$ is lowered further to approximately 0.0007. This represents an improvement of three orders of magnitude over the original data (i.e., the co-pol data not processed by the preferred embodiment processing stages).

The exceedance curve for the 3-feature image ($f_1f_2f_3$) suggests that it performs best if the targets of interest are lower than 104 dB. In that case, the fraction of clutter pixels above the specified target level will be less for the 3-feature system. Above about 104 dB, however, the 2-feature system performs slightly better. Note that for higher values of x, both the 2-feature and the 3-feature systems perform better than the (modified) PMOD system, which, in turn, performs better than the original co-pol system.

The presence of foliage or naturally occurring clutter (trees, large rocks, brush, grasses) can increase the amount of energy reflected by non-target objects, making it much more difficult to distinguish targets from background clutter. Such clutter objects may also obscure the targets of interest, either partially or completely. See in this regard Simms, Janet E. "Applications of Synthetic Aperture Radar(SAR) to Unexploded Ordnance (UXO) Delineation" U.S. Corps of Engineers, Engineer Research and Development Center (August 2003), hereby incorporated by reference as though reproduced herein in its entirety.

FIGS. 7 and 8 show exceedance plots for different clutter backgrounds (clutter background 2 and clutter background 3). From the various plots it becomes clear that the selection of the 2-feature or 3-feature system will depend heavily on the anticipated clutter background. Once again, however, the multi-feature system performs better than the original PMOD system over a wide range of x values.

In summary, the curves in FIGS. 6-8 display the fraction of clutter pixel values exceeding a given value, these pixel values being expressed in a logarithmic scale (i.e., "decibels," or "dB"). To normalize the pixel values across all detector configurations, the same target is defined to have the same maximum pixel value, regardless of the feature-set used to derive it. The remaining pixel values are then scaled by the factor required to force the maximum target pixel value to this specified value. FIGS. 6-8 show exceedance curves for the original co-pol image, the (modified) PMOD image, the detection image calculated using only two features, and the detection image calculated using all three features. Upon closer examination of FIG. 6, it is observed that the exceedance plot for the 3-feature system ($f_1f_2f_3$) suggests that it performs best if the targets of interest are lower than 104 dB. In that case, the fraction of clutter pixels above the specified target level (i.e., the $P_{fa}$) will be lower for the 3-feature system. Above about 104 dB, however, the 2-feature system ($f_1f_2$) performs slightly better. Note that for higher values of x, both the 2-feature and the 3-feature systems perform better than the (modified) PMOD system, which, in turn, performs better than the original co-pol system. A similar analysis can be performed for background clutter scenarios depicted in FIGS. 7 and 8. In each case, the "best-performing" system configuration at a given target level (i.e., value of x) is the one producing the lowest $P_{fa}$ (i.e., the lowest value of y).

Figure 9:
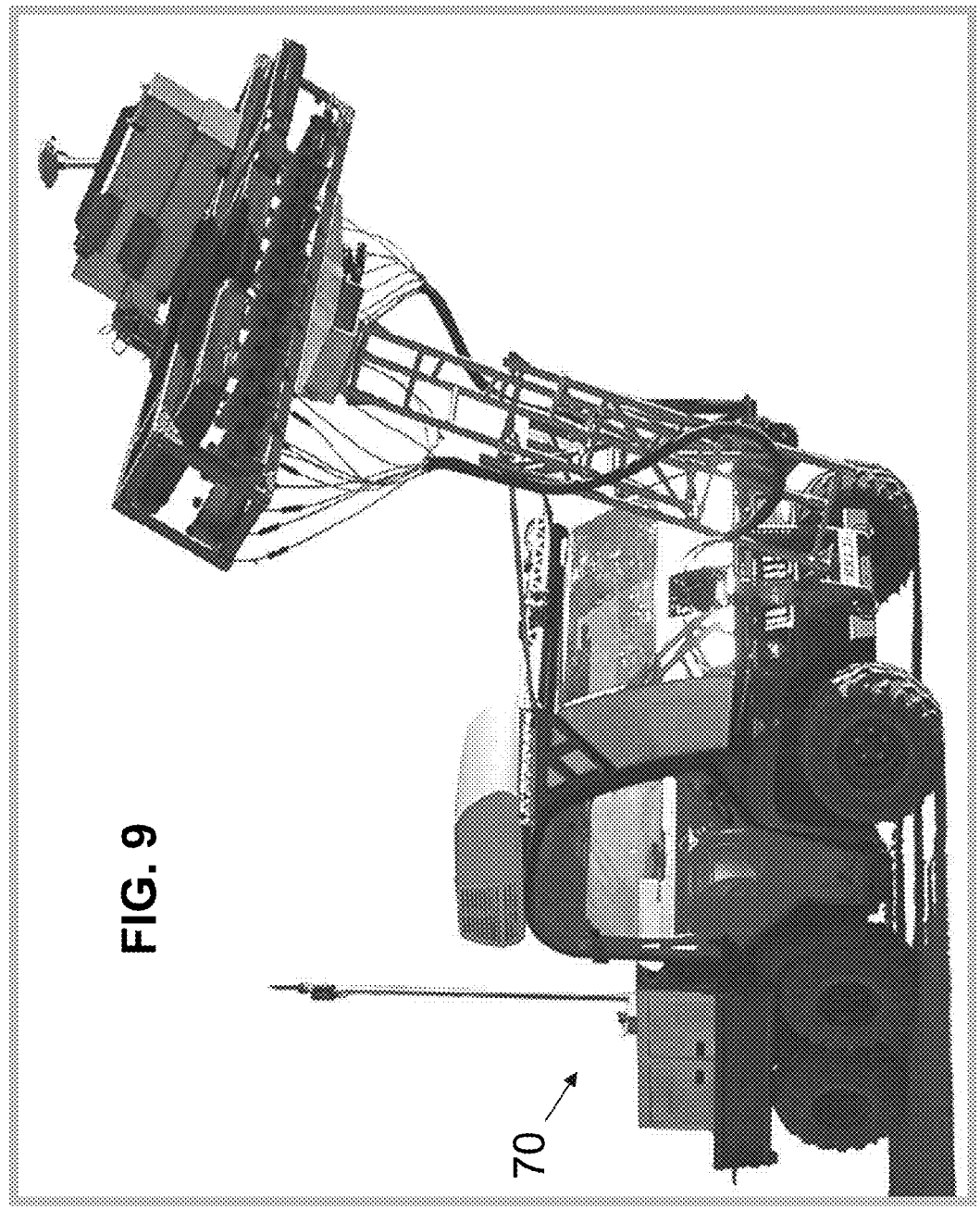
FIG. 9 is a perspective view of an exemplary vehicle mounted ALARIC (Army Look Ahead Radar Impulse Countermine) multi-transmitter/receiver (array based) GPR (ground penetrating radar) system described in U.S. Pat. No. 9,395,437 incorporated hereby by reference as though fully rewritten herein that may be used for collecting data for a preferred embodiment of the present invention.
Figure 10:
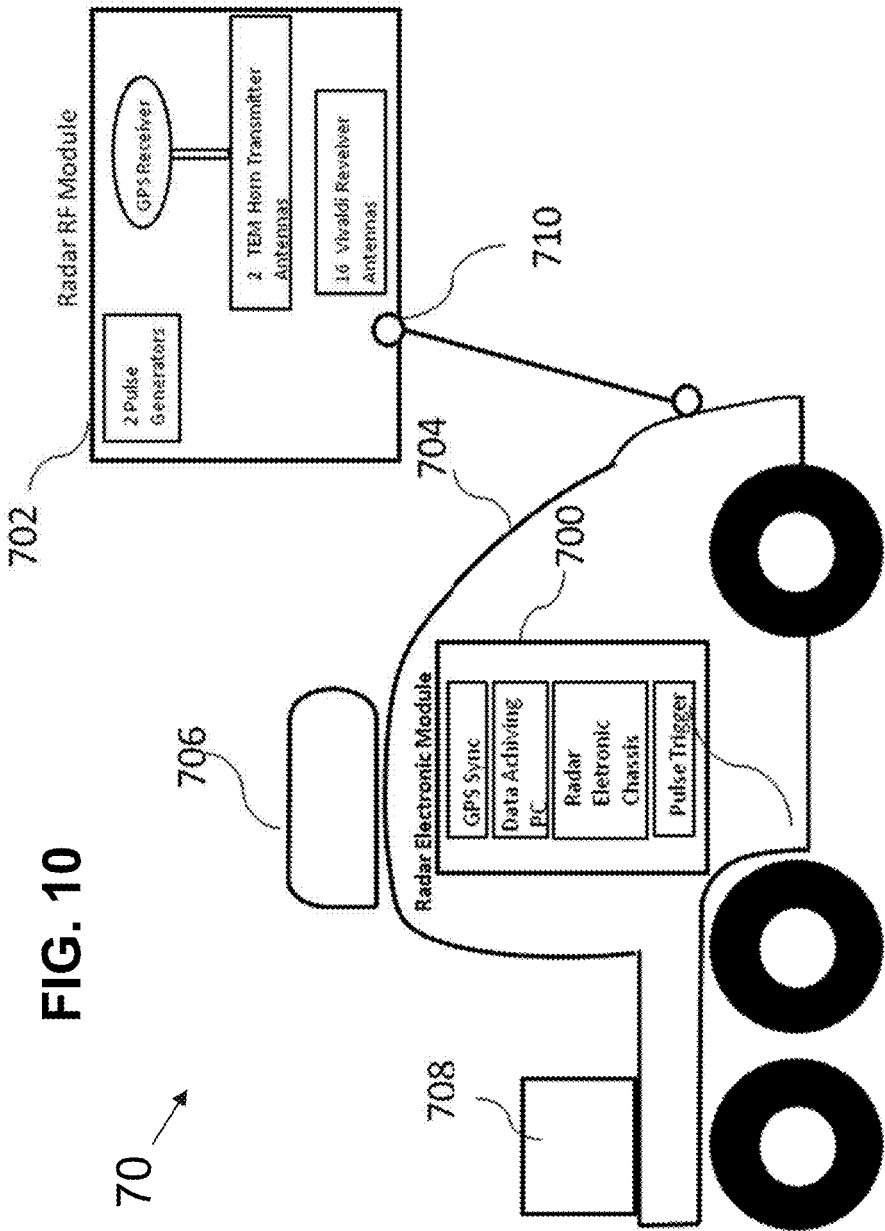
FIG. 10 is a block diagram of an exemplary vehicle mounted ALARIC (Army Look Ahead Radar Impulse Countermine) multi-transmitter/receiver (array based) GPR (ground penetrating radar) system.
Figure 11:
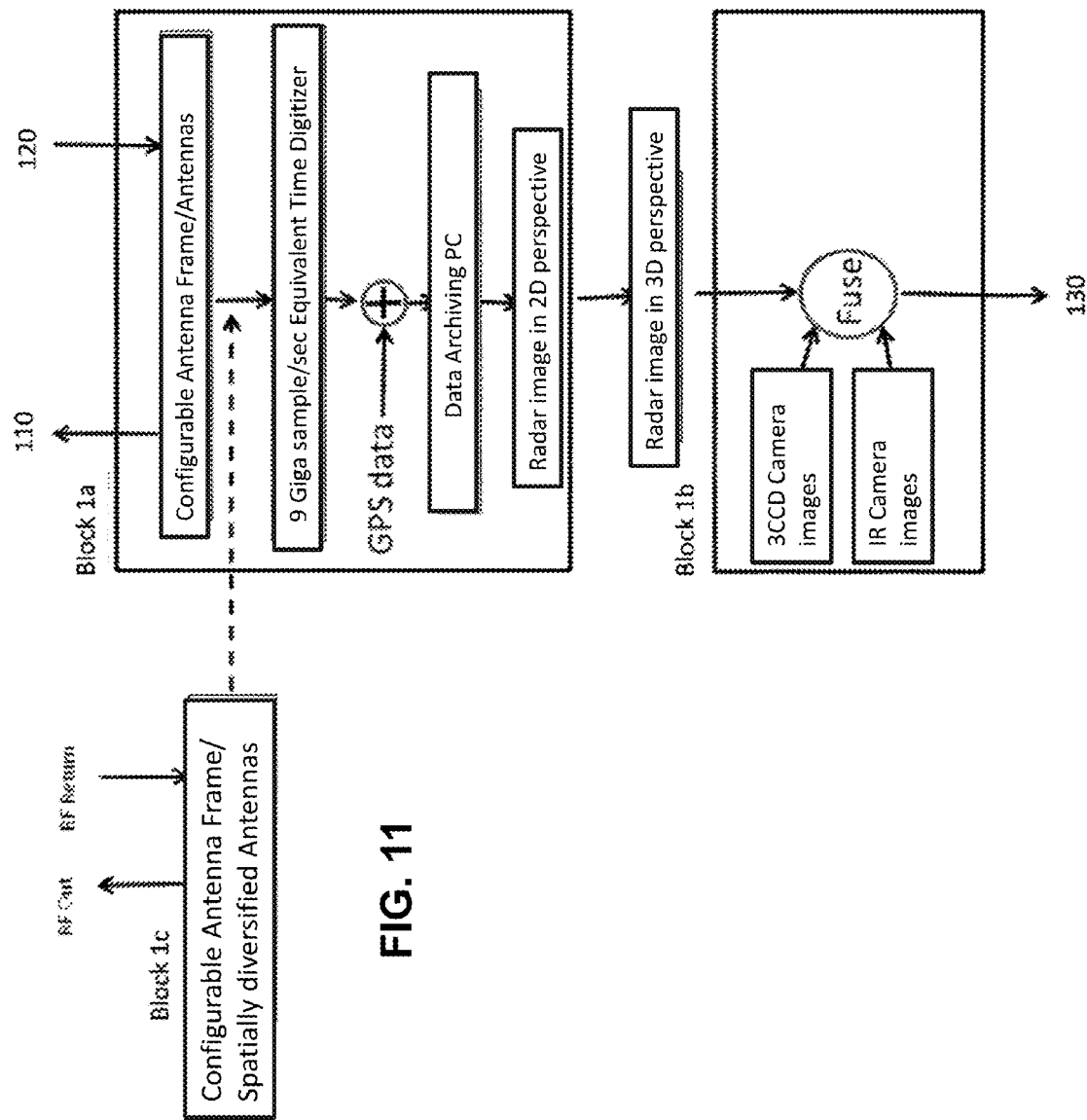
FIG. 11 illustrates an exemplary method of multipolarization multi-transmitter/receiver ground penetrating radar standoff detection.
Figure 12:
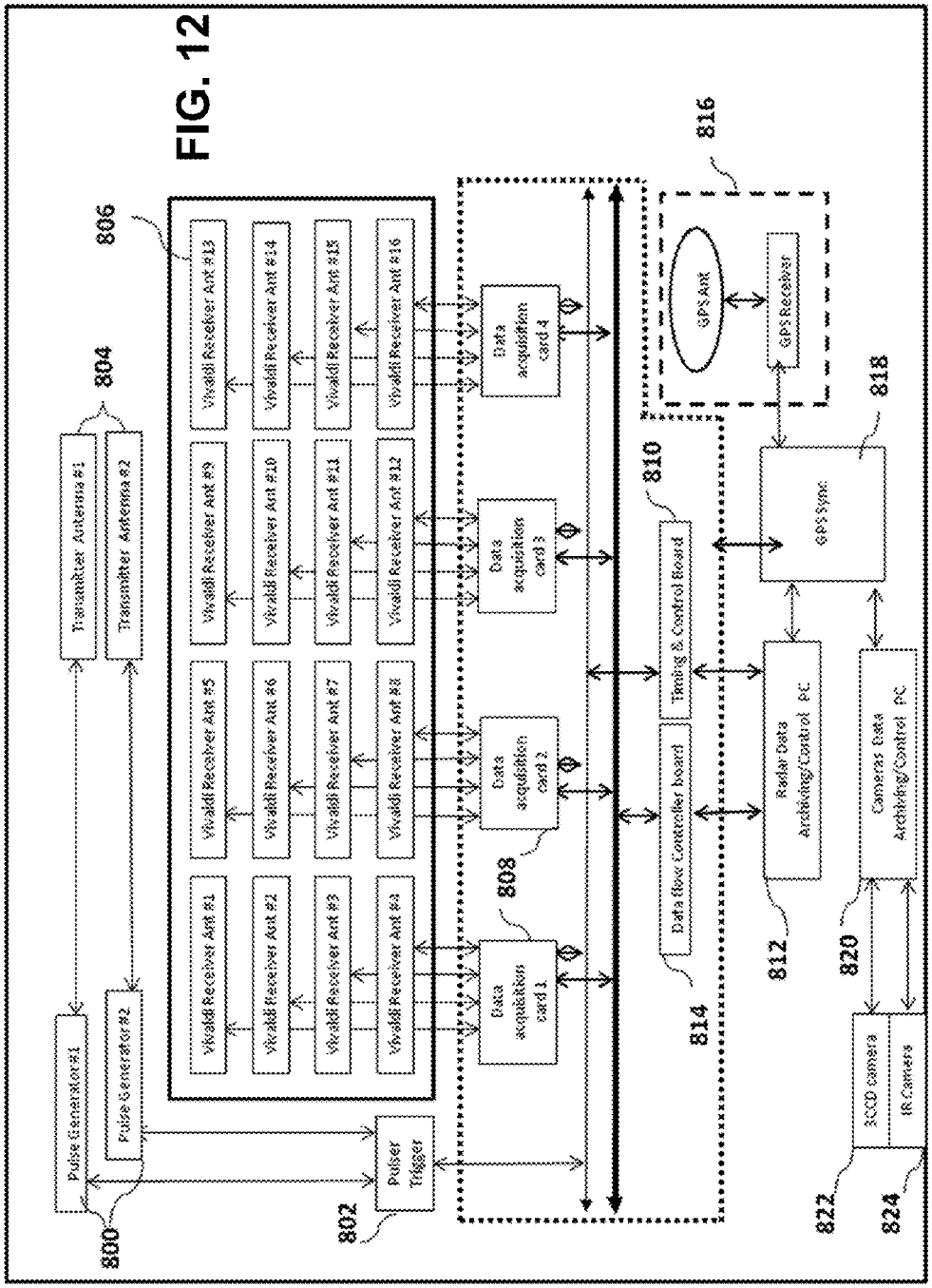
FIG. 12 is a schematic illustration of an examplary ALARIC mulit-transmitter/receiver (array based) GPR detailed system block diagram suitable for collection of data for a preferred embodiment of the present invention.
Figure 13:
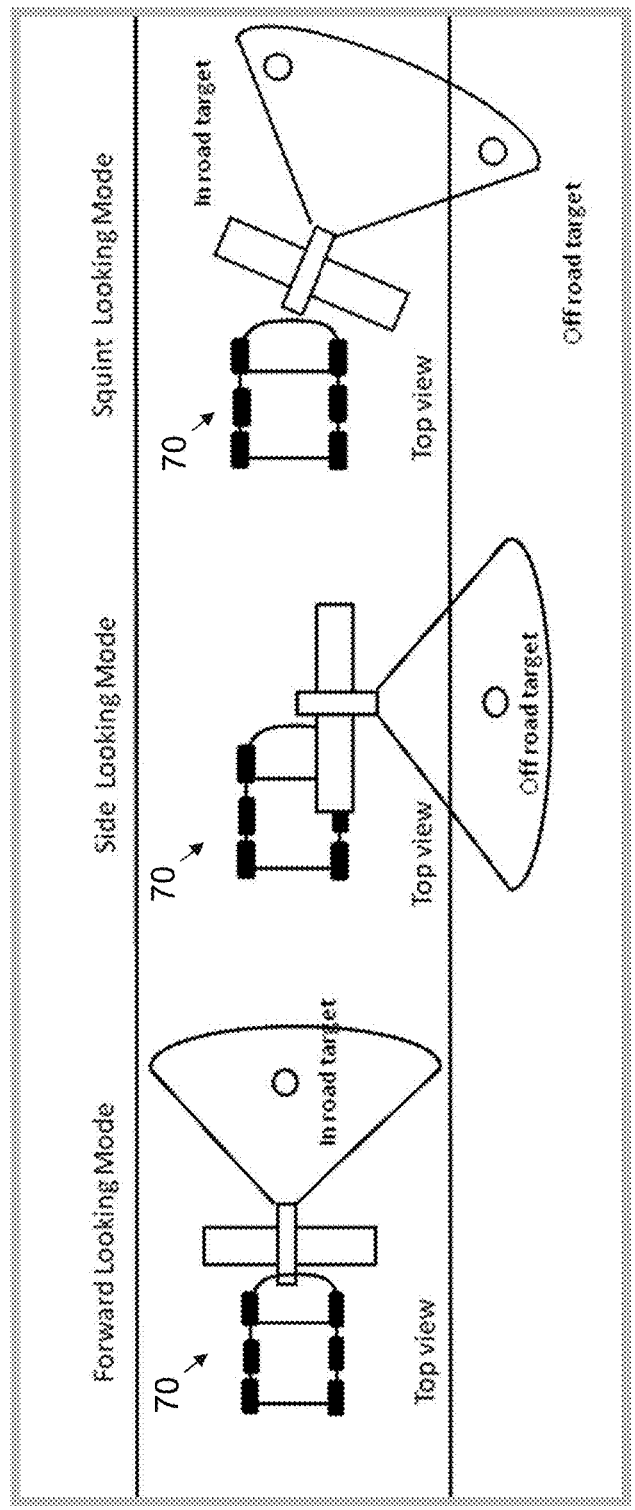
FIG. 13 illustates an exemplary ALARIC radar in different configurations to detect different types of targets, e.g., forward looking mode, side-looking mode, and squint looking mode for collection of data for a preferred embodiment of the present invention.
Figure 14:
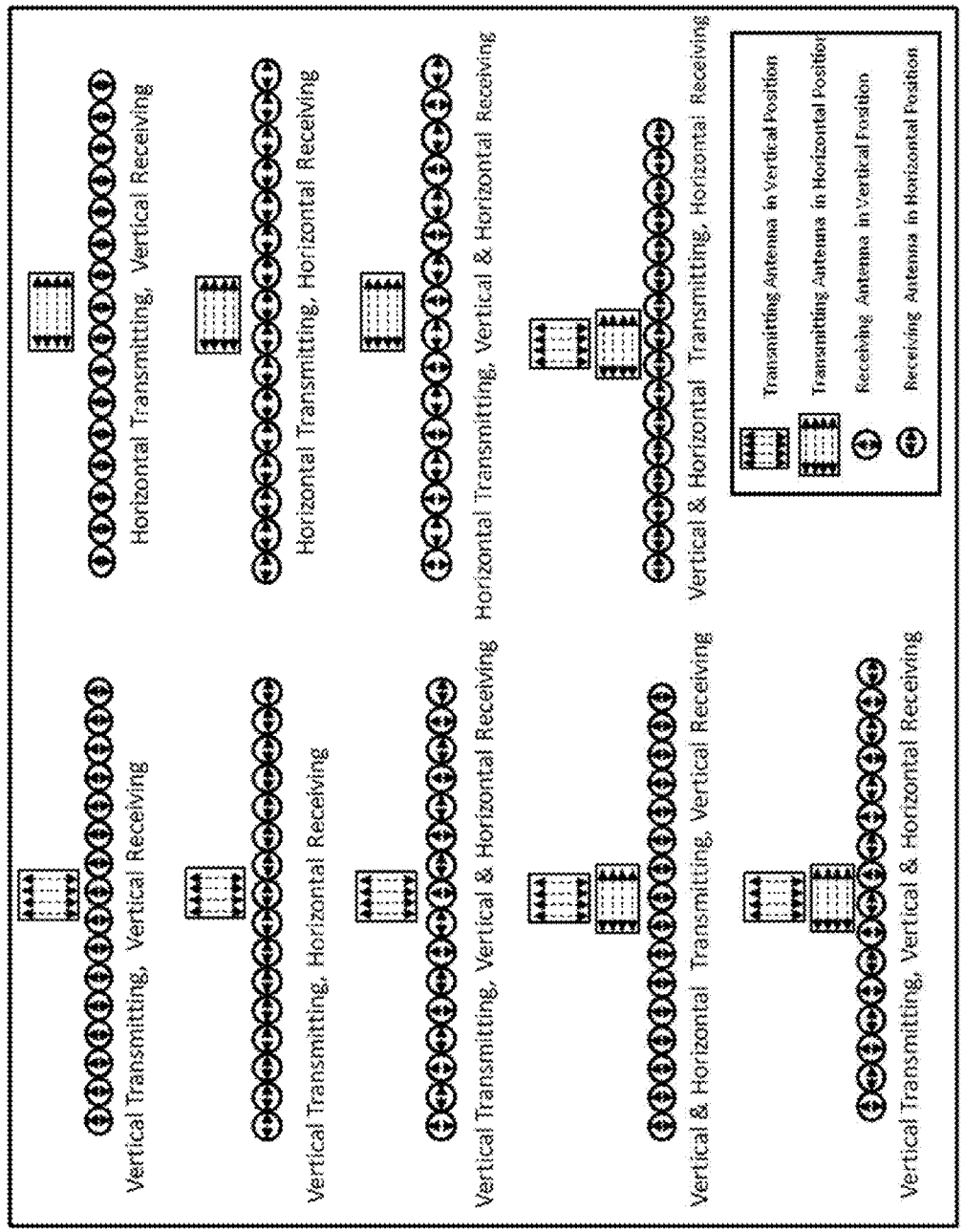
FIG. 14 illustrates exemplary radar configurations with different antenna polarizations for collection of data for a preferred embodiment of the present invention.
Figure 15:
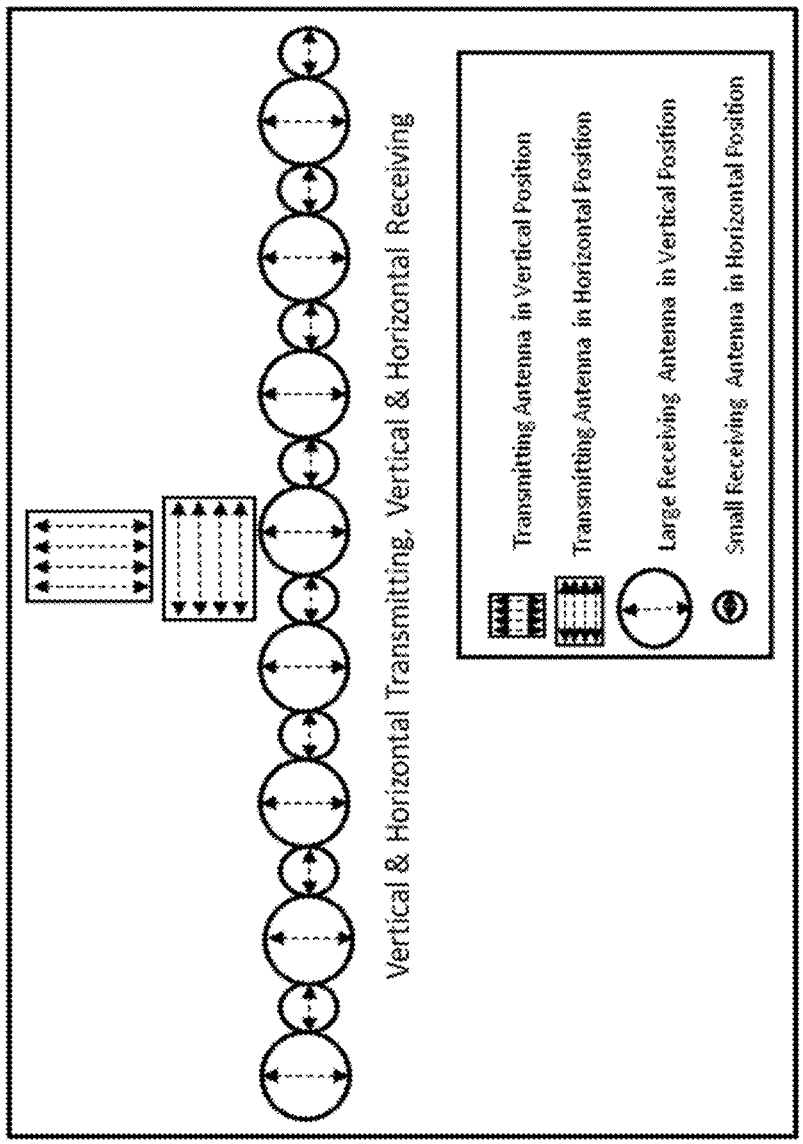
FIG. 15 illustrates exemplary radar configurations with different receiving antenna types and polarizations (vertical and horizaontal transmitting and vertical and horizontal receiving).

FIG. 9 is an illustration showing the ALARIC Multi-Transmitter/Receiver (Array-Based) GPR: A moving multi-polarization multi-transmitter/receiver Forward Looking Ground Penetrating Radar (FLGPR) system is discussed, e.g., for standoff detection of buried targets within an irradiated scene. ALARIC is a prototype radar system designed and constructed by the U.S. Army Night Vision and Electronic Sensors Directorate (NVESD). Shown in FIG. 9 is an exemplary profile view of the vehicle-mounted ALARIC multi transmitter/receiver array based ground penetrating radar. FIG. 10 illustrates, e.g., the vehicle-configured radar hardware, including two main modules; the Radar Electronic Module 700 and the Radar Radio Frequency Module 702. Standoff detection is described for surface and buried targets in or on the road side for ground vehicle using RF impulse signal. FIG. 11 shows an exemplary method of multipolarization multi-transmitter/receiver ground penetrating radar standoff detection. Referring to Block 1a, a sequence of 1 ns wide, 50 volt peak-to-peak RF impulse signals 110 are transmitted by using either one or a number of impulse generators paired with transmit antennas, while the vehicle moves forward on the road. The transmit antenna is placed at the center of the antenna frame in either horizontal or vertical FIG. 8b of U.S. Pat. No. 9,395,437 shows an exemplary reconstructed image using: a) conventional backprojection (left); and b) adaptive multitransceiver processing (right). polarization. The antenna frame is mounted on an articulable telescope boom, which enables the radar to be configured for different scanning modes. The forward-looking mode is optimized for operation as the radar moves forward on the road. The transmit antenna is placed at the center of the antenna frame in either horizontal or vertical polarization. The antenna frame is mounted on an articulable telescope boom, which enables the radar to be configured for different scanning modes. The forward-looking mode is optimized for in-road targets detection, the side-looking mode is optimized for off-road targets, and squint-looking mode is used both types of targets; the returned impulse RF signals 120 (FIG. 11) are captured by an array of sixteen identical Vivaldi notch antennas 804 placed in either the horizontal or the vertical polarization inside the antenna frame; the impulse signals come out of Vivaldi notch antennas are in analog format and then converted to digital format by a digitizer which uses Equivalent Time Sampling technique to digitize the analog signals at an equivalent rate of 8 G samples/second; the digitized signals coming out of the digitizer are then interleaved with header and trailer, which contain geo-locations, and time information from the GPS Resync Module; and the radar data stream along with the GPS information are archived to hard drive in a Data Archiving PC. The Archived Radar data are processed to produce Radar Images and stored in computer memory. Specifically, referring back to FIG. 10, both the Radar Electronic Module 700 and the Radar Radio Frequency Module 702 are mounted on a John Deere M-Gator surrogated vehicle 704. The radar electronic module is designed with PECL logic families that are very fast but generate a large amount of heat, which a roof top mounted Air Conditioner unit 706 is used to provide cooling for the electronics equipment. The radio frequency module contains transmit and receive antennas of the radar system. A pair of pulse generators, which is controlled by the radar electronic module, completes the RF module. While the gator testbed is diesel powered, the entire radar system is powered by a portable gasoline generator 708 mounted at the back of the vehicle. A detailed radar system block diagram for such an exemplary ALARIC multi-transmitter/receiver (array-based) GPR system is shown in FIG. 12. Some notable highlights of the radar system are included in the following section. In the figure, the Impulse Generator Triggering units Module 802 will activate the two Impulse Generators Module 800, which generate a 50 Vpp impulse that has a center frequency at around 950 MHz, and occupies a bandwidth that spans between 300-3000 MHz. The down range resolution is derived from this bandwidth and is about 5 cm. The impulse signals are then fed to a pair of TEM horn transmit antennas 804, placed at either the two ends or the center of the Antenna Frame, to provide good pulse fidelity while minimizing the reflected power of the transmitter. (See, e.g., K. Shlager, G. Smith, and J. Maloney, "TEM Horn Antenna for Pulse Radiation: an Improved Design." Micro. Opt. Tech Letters 1996 12(2), 86-90, incorporated herein by reference.) The returned RF signals are captured by an array of sixteen identical Vivaldi notch antennas 806. These receive antennas are selected because of their size and low cross coupling between antennas in the array. (See, e.g., T. H. Chao, and D. Schaubert, "Large Wideband Dual Polarized Array of Vivaldi Antennas with Radome." Asia Pacific Microwave Conference, Vol. 1, Singapore, Institute of Electrical and Electronic Engineering, 92-95, 1999, incorporated herein by reference.) After the signals are captured by the receive antennas, the data are digitized and passed to the four Data Acquisition cards Module 808. Each card can receive four analog input signals from four receiver antennas Module 806. A Timing and Control board Module 810 provides the clock references and controls the overall operation of the radar system. Furthermore, the timing and control board also serves as a microcontroller interface that includes triggering the pulse generator at 1 MHz PRF and providing a stable clock for sampling the return signal at an effective 8 GHz sampling rate. The core of the circuit is a Field Programmable Gate Array (FPGA) chip that provides state machine logic and ultra-precise timing for the radar. As the radar moves along the test lane, data is continuously collected so that a two dimensional synthetic aperture image is formed. The data from the four acquisition cards are passed to a Radar Data Archiving/Control PC Module 812 which acts as the operator control, status display, and data archiving via the data flow controller card Module 814. To acquire the exact location of the radar during data collection, a high precision GPS system Module 816 is used to determine the location by timing the satellite signals transmitted to the GPS receiver. At the midpoint of each radar frame during data collection, the timing and control electronic module triggers the GPS Sync Unit Module 818, which activates the hardware element to extract the location and time information from the GPS data stream. The result is buffered along with the radar data and feed to the Data Archiving computer for data storage. A method is described to fuse the radar data with photos of a 3-CCD-camera, and an IR camera to improve the overall detection performance of the system. FIG. 11 shows an exemplary method of multi-polarization multi-transmitter/receiver ground penetrating radar standoff detection. Referring specifically to Block 1b, such a method is comprised of the following steps: Using computers to continuously trigger the 10 cameras, transferring captured images to computers, and assigning a frame number to each of the captured images; using a GPS Resync Module to store into the computer the GPS times, locations, and the frame numbers of the photo images whenever the cameras are triggered; after radar 15 images are formed, if suspicious threat are detected in the radar image, then convert radar images from a 2-dimensional into a 3-dimensional perspective as in the camera photo images; using the GPS data as index to retrieve the corresponding photo images of 3-CCD camera and IR cameras 20 from computer memory; and fusing camera photo images with radar images 130 to help determine whether a detected threat is sufficiently real. Specifically, to improve the overall detection performance while reducing the false alarm rate of the radar, the system 25 employs a 3-CCD-camera Modules 822 and an IR camera Module 824 as shown in FIG. 12. The goal is to collect still photo images of the scene in front of radar as it moves along the road. The camera systems provide visual information in the optical domain while the radar interrogates the same scene 30 in the RF domain.

The synchronization process among the sensors is described in the following paragraph. During data collection, both cameras take pictures independently and at different rates. To geo-reference the locations where the images are taken, the GPS Sync Module 818 detects when each of the 2 cameras or the Radar is triggered, and then immediately parses the GPS data stream to include a timestamp, photo number, and GPS location for each photo image to radar Data. The results are passed to the Camera Data Archiving and Control PC Module 820 for storage (see FIG. 12). When targets are detected in the radar image, the computer will convert the radar images from 2-dimensional perspective to 3-dimensional perspective as in the camera photos. The GPS data are then used to index and retrieve the correspondent cameras 45 photos. These color and IR camera images can be fused together with the radar image to create a 3-dimensional rendering of the landscape such as in augmented reality. The purpose is to ascertain additional sensory information in different domains to determine whether a detected threat is sufficiently real. By combining the information from multiple sensors, the false alarm rate may be reduced while improving the overall detection performance of the system. An exemplary arrangement used to collect data for image processing is described. FIG. 11 shows an exemplary method of multi-polarization multi-transmitter/receiver ground penetrating radar standoff detection. Referring specifically to Block 1c, the transmit and two types of receive antennas are spatially-diversified, some of which have H polarization and others with V polarization, to achieve optimum signal returns for surface and buried targets. The method comprised of the following steps: Placing the transmit antennas in either horizontal or vertical polarization for transmitting impulse RF signal. Two different sets of Vivaldi antennas are used for receiving the returned impulse RF signals. The first set of Vivaldi antennas, which has the frequency range from 200 MHz to 3000 MHz, is oriented in the vertical polarization. The second set of Vivaldi antennas, which has frequency range from 500 MHz to 3000 MHz, is oriented in the horizontal polarization. Interleave the location of the receive Vivaldi antennas. The first antenna in the array is from the first set, and the second antenna is from the second set. Repeat the configuration for the rest of the receiving antennas in the antenna array. These unique arrangements are used to collect data to be used for the Image Processing Algorithm described in U.S. Pat. No.9,395,437 herein incorporated by reference.

Advantages of the Invention

Various systems have been previously proposed for the detection of the symmetries in fully polarimetric SAR. These systems, however, rely on the calculation of specific statistics produced by transformation of the underlying polarization states. For example, the asymmetry angle produced by polarimetric decompositions has been proposed for detection of symmetric objects in a SAR image. The value of this statistic is compared to expected values for man-made objects, and a decision is made as to whether or not a target is present in the scene. Such a method, however, is not inherently amenable to spatial averaging (i.e. speckle reduction). Hence, it is subject to the high variability commonly encountered in SAR image pixel values.

The present invention is designed to reduce the variability of statistics calculated to detect symmetric, man-made objects in SAR imagery. This is achieved via the incorporation of averaging and the utilization of non-coherent, magnitude data. Based on data examined to date, the algorithm increases the target-to-clutter ratio when targets are symmetric while leaving them nearly unchanged when targets are asymmetric.

The present invention could also be used in imagery produced by other sensors if multiple channels are available, and the measured signals from targets of interest are larger in certain channels while remaining smaller in others. This method has, however, not yet been extended to other sensor data (such as hyperspectral or multispectral imagery).

The present invention represents a novel extension of anomaly detection techniques to target detection in fully polarimetric SAR data. While SAR anomaly detection algorithms (e.g. constant false alarm rate (CFAR) prescreeners) typically operate on a single image, the present invention combines information from multiple channels to enhance the contrast between target and background.

Since manmade objects often exhibit left-right symmetry not found in nature, a sensor capable of distinguishing such symmetries effectively distinguishes manmade (symmetric) objects from naturally occurring (asymmetric) ones. The present invention comprises such a system for detecting symmetric objects in fully polarimetric, synthetic aperture radar (SAR) imagery. The present invention may incorporate the complex magnitude of each component image pixel, thereby enabling the exploitation of spatial averaging for reduction of pixel variability. Finally, it leverages well-established concepts of anomaly detection to "amplify" the signal from symmetric, man-made targets while leaving signals from asymmetric, natural clutter objects essentially unchanged.

Potential Uses

Potential military uses include the detection of unexploded ordinances (UXOs) such as 155 shells and landmines as well as general remote monitoring of the environment.

The present invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

As used herein, the terminology "symmetry" means the quality of being made up of substantially similar parts facing each other or around an axis. Alternatively, symmetry means substantially invariant to a transformation, such as for example, reflection but including other transforms too.

As used herein the terminology "point of left-right point of symmetry" means the point where substantial symmetry occurs or exists to the left and right of the "point of left-right symmetry." If the object is rotated, the axis of symmetry will rotate correspondingly.

As used herein, the terminology "polarimetric" means relating to the rotation of the plane of polarization of polarized electromagnetic waves.

As used herein, the terminology "pixel under test" means the pixel being tested or the pixel chosen to undergo review. Similarly, areas of interest or potential areas of interest relate to selection of areas for the determination of the presence of a maximum in the co-pol image and a null state in the cross-pol image indicating the potential detection of a man-made object As used herein, the terminology "polarimetry" means the process of measuring the polarization of electromagnetic waves, such as radar waves, generally in the context of waves that have traveled through or have been reflected, diffracted or refracted by a material or object.

In polarimetric systems, pulses are transmitted and received with both horizontal and vertical polarizations. As used herein, the terminology (a) "horizontal-horizontal" or HH means horizontal transmit, horizontal receive, (b) HV, horizontally transmit, Vertical receive, (c) VV, Vertical transmit, Vertical receive, and (d) VH, Vertical transmit, Horizontal receive).

As used herein, the terminology "co-polarimetric" or co-polarized radar data means horizontal-horizontal," or horizontal transmit, horizontal receive, radar data, and VV, Vertical transmit, Vertical receive radar data.

As used herein the terminology cross polarimetric radar data means one or both of HV, horizontally transmit, Vertical receive and/or VH, Vertical transmit, Horizontal receive radar data.

As used herein the terminology "null" refers to a minimum response as used and/or defined in Wolfgang-Martin Boehner, "BASIC CONCEPTS IN RADAR POLARIMETRY" POLSARPRO V3.0—LECTURE NOTES, http://earth.esa.int/landtraining07/polsar_basic_concepts.pdf.

As used herein the terminology "noise" refers to any random fluctuations of data that hinders perception of the intended signal.

As used herein the terminology "maximum" refers to an intensity level that is significantly greater, higher and/or more intense relative to its surroundings.

As used herein the terminology "clutter" refers to interference from one or more of foliage, grass, rocks, or similar items which interfere with detection of a man-made object.

As used herein, the terminology "patch" is a portion of the radar image.

Patents, patent applications, or publications mentioned in this specification are incorporated herein by object to the same extent as if each individual document was specifically and individually indicated to be incorporated by object.

The foregoing description of the specific embodiments are intended to reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A system for determining the location of a man-made object based upon symmetry of the object comprising:
   a receiver configured to receive radar signals comprising cross-polarized and co-polarized responses, the co-polarized responses measured either by transmitting and receiving both horizontally polarized waves (horizontal-horizontal) or by transmitting and receiving both vertically polarized waves (vertical-vertical); the cross-polarized responses measured by either transmitting horizontally polarized waves and receiving vertically polarized waves (horizontal-vertical) or by transmitting vertically polarized waves and receiving horizontally polarized waves (vertical-horizontal);
   at least one processor, the at least one processor configured to process horizontal-horizontal co-polarimetric (co-pol) data, vertical-vertical co-polarimetric data, and one or both of the vertical-horizontal cross-polarimetric data and horizontal-vertical polarimetric data to form co-polarized images and cross-polarized images;
   the at least one processor configured to process the co-polarized and cross-polarized images to locate areas of interest containing a maximum in the co-pol image and a null state in the cross-pol image indicating the potential detection of a man-made object; the at least one processor being configured to filter data using buffer regions in the vicinity of an area of interest to reduce error.

2. The system of claim 1 wherein the at least one processor is configured to perform a summation operation on the pixels in the vicinity of an area of interest in the cross-polarized image and normalize the summation total by dividing by the number of pixels in the area summed to obtain a value indicative of the normalized intensity of the background; and wherein the at least one processor is configured to perform a summation operation on the pixels in an area of interest in the cross-polarized image and normalize the summation total by dividing by the number of pixels in the area of interest indicative of the normalized intensity of the area of interest; and wherein the at least one processor operates to divide the normalized intensity of the area of interest by the normalized intensity of the background to obtain a value indicative of the presence of a man-made object.

3. The system of claim 1 wherein the at least one processor is configured to perform a summation operation on the pixels in the vicinity of an area of interest in the co-polarized image and normalize the summation total by dividing by the number of pixels in the area summed to obtain a value indicative of the normalized intensity of the background; and wherein the at least one processor is configured to perform a summation operation on the pixels in an area of interest in the co-polarized image and normalize the summation total by dividing by the number of pixels in the area of interest indicative of the normalized intensity of the area of interest; and wherein the at least one processor operates to divide the normalized intensity of the area of interest by the normalized intensity of the background to obtain a value indicative of the presence of a man-made object.

4. The system of claim 1 wherein the at least one processor is configured to compute a spatial average and divide the spatial average by the intensity of the background and wherein the at least one processor is configured to reduce the value of pixels in an area of interest using a normalization process to thereby reduce effects of background and wherein the at least one processor determines the intensity of the background using the pixels surrounding the area of interest and calculating an average pixel value of the surrounding pixels.

5. The system of claim 4 wherein the spatial average is computed using the equation:

$$I_{filtercross}(x, y) = \sum_{i=0}^{N_p} I_{cross}(x, y - \lfloor N_p/2 \rfloor + i)$$

where $I_{cross}(x,y)$ denotes the image from the cross polarimetric radar data pixel at (x,y), where x is the cross-range coordinate, y is the down-range coordinate, $N_p$ is the number of pixels used for spatial averaging, and $\lfloor N_p/2 \rfloor$ denotes the largest integer less than or equal to $N_p/2$, where $N_p$ could be equal to zero for the co-polarimetric image.

6. The system of claim 5 wherein the at least one processor determines the effect of background pixels in the cross polarimetric image after skipping a number of pixels m using the equation:

$$I_{cross\ denominator}(x, y) = \sum_{i=m+1}^{M} I_{filter,cross}(x - i, y) + \sum_{i=m+1}^{M} I_{filter,cross}(x + i, y)$$

where x and y are coordinates, M is the number of cross-range cells on either side of a pixel under test in the cross-polarimetric image, m is the number of guard cells on either side of the pixel under test to be skipped before calculating a background average, where m may be equal to zero, and using the image cross denominator where, $I_{filter,\ cross}$ is the filtered cross-pol image and $I_{cross\ denominator}$ is used to determine the $I_{cross\ contrast}$.

7. The system of claim 6 wherein for each pixel in the cross-pol image the at least one processor calculates the contrast between the pixel under test and any high intensity values the surrounding pixels by calculating the cross image contrast using the equation:

$$I_{cross\ contrast}(x, y) = \frac{I_{filter\ cross}(x, y)}{I_{cross\ background}(x, y)}$$

where $I_{filter\ cross}$ (x,y) is the filtered cross-pol image at coordinates (x,y), and $I_{cross\ background}$ (x,y) correlates to the background intensity in the cross polarimetric image at coordinates (x,y) and the at least one processor calculates a polarimetric manmade object detector output statistic $T_1$ using the equation:

$$T_1(x, y) = \frac{I_{filter,co}(x, y)}{I_{cross\ contrast}(x, y)},$$

where $I_{filter,\ co}(x,y)$ denotes the filtered co-pol image at coordinates (x,y).

8. The system of claim 7 wherein the at least one processor is configured to incrementally select pixels under test, determine the spatial average, determine the background intensity, use the corresponding pixel under test in the filtered co-polarimetric image and divide by the ratio of the spatial average to the intensity of the background to compile a list of statistical values indicating the likelihood of a manmade object, and compare the statistical value to the correlated value of corresponding pixel under test in the co-polarimetric image and wherein a large value for the pixel under test in the co-polarimetric image is indicative of a manmade object.

9. The system of claim 8 wherein the at least one processor is configured to determine whether the reciprocal of the ratio of the statistical value to the correlated value of corresponding pixel under test in the co-polarimetric image is greater than 6 dB to indicate the presence of a man-made object.

10. The system of claim 1 wherein the polarimetric images are polarimetric SAR images, and wherein the horizontal-horizontal polarimetric images, the vertical-vertical polarimetric images, and one or both of the vertical-horizontal polarimetric images and horizontal-vertical polarimetric images are co-registered SAR images, and wherein a location in each of the images has a corresponding location in the other co-registered SAR images.

11. The system of claim 9 wherein the at least one processor is configured to determine within an area of interest if a pixel under test intensity differs from the pixels in the vicinity by at least 15 dB in order to determine the pixel location of the cross-range coordinate determinative of the left-right point of symmetry.

12. A method for determining the location of a man-made object comprising the following steps, not necessarily in order;
inputting image data comprising four co-registered polarimetric SAR images of a common scene; the four co-registered polarimetric images comprising horizontal-horizontal, horizontal-vertical, vertical-vertical and vertical-horizontal polarimetric images, the inputted image data comprising pixel values representing the polarimetric SAR images, a location in each of the four co-registered SAR images having a corresponding location in the other three co-registered SAR images; each of the four co-registered SAR images being inputted into at least one processor; the at least one processor being configured to calculate a statistic indicating the likelihood that a manmade object is present by selecting a plurality of pixels under test and using at least one processor:
determining the intensity of the background for the pixels under test by skipping a predetermined number of cross-range cells on either side of a pixel under test in the cross-pol image to calculate a background average for pixels on either side of the pixel under test;

spatial averaging at a plurality of pixel locations in the vicinity of the pixel under test to determine the background average intensity for the pixel under test;

comparing the intensity of the pixel under test with the background intensity to determine potential man-made objects.

13. The method of claim 12 wherein determining the intensity of the background comprises skipping a predetermined number M pixels for each pixel in the filtered cross-pol image using the equation:

$$I_{cross\ denominator}(x, y) = \sum_{i=m+1}^{M} I_{filter,cross}(x - i, y) + \sum_{i=m+1}^{M} I_{filter,cross}(x + i, y)$$

where (x,y) are the pixel coordinates, $I_{filter,\ cross}$ is the filtered cross-pol image and $I_{cross\ denominator}$ is used to determine the $I_{cross\ contrast}$ in the following equation:

for each pixel in the cross-pol image calculating the quantity:

$$I_{cross\ contrast}(x, y) = \frac{I_{filter,cross}(x, y)}{I_{cross\ denominator}(x, y)}$$

and wherein comparing the intensity of the pixel under test with the background intensity to determine potential man-made objects comprises calculating a polarimetric manmade object detector output statistic $T_1$ using the equation:

$$T_1(x, y) = \frac{I_{filter,co}(x, y)}{I_{cross\ contrast}(x, y)};$$

where $I_{filter,\ co}(x,y)$ denotes the filtered co-pol image.

14. The method of claim 12 wherein the spatial averaging comprises utilizing the complex magnitude of each component image pixel, thereby enabling the exploitation of spatial averaging for speckle reduction, and wherein the processor spatial averages the pixels using the equation:

$$I_{filter}(x, y) = \sum_{i=0}^{N_p} I(x, y - \lfloor N_p/2 \rfloor + i)$$

where I (x,y) denotes the image from either co-polarimetric or cross polarimetric radar data at pixel (x,y), where x and y are coordinates, $N_p$ is the number of pixels used for spatial averaging, and $\lfloor N_p/2 \rfloor$0 denotes the largest integer less than or equal to $N_p/2$, where $N_p$ could be equal to zero for the co-polarimetric image.

15. A system for determining the location of a man-made object based upon symmetry of the object comprising:

a receiver configured to receive radar signals comprising cross-polarized and co-polarized responses and cross pol polarimetric images;

at least one processor, the at least one processor configured to combine the horizontal-horizontal polarimetric images and vertical-vertical polarimetric images to form co-polarimetric images and operate on one or both of the vertical-horizontal polarimetric images and horizontal-vertical polarimetric images to form cross-polarized images;

the at least one processor configured to process the co-polarized and cross-polarized images to locate pixels of interest containing a maximum intensity in the co-pol image and a null state in the cross-pol image indicating the potential detection of a man-made object; the maximum intensity and null state being determined by comparing the pixels of interest with pixels in the vicinity of the pixels of interest to obtain relative intensity values; the at least one processor refining the evaluation of pixels in the vicinity of pixels of interest by using spatial averaging at a plurality of pixel locations in the vicinity of the pixels of interest and the at least one processor configured to skip a predetermined number pixels on either side of the pixel or pixels of interest before calculating the background average in order to diminish the effects of noise.

16. The system of claim 15 wherein the at least one processor skips a predetermined number pixels on either side of the pixel or pixels of interest in a filtered cross-polarimetric image according to the equation:

$$I_{cross\ background}(x, y) = \sum_{i=m+1}^{M} I_{filter,cross}(x - i, y) + \sum_{i=m+1}^{M} I_{filter,cross}(x + i, y)$$

where $I_{filter,\ cross}$ is the filtered cross-polarimetric image;

the at least one processor configured to calculate the quantity for each pixel in the cross-pol image:

$$I_{cross\ contrast}(x, y) = \frac{I_{filter,cross}(x, y)}{I_{cross\ background}(x, y)};$$

the at least one processor configured to calculate a polarimetric manmade object detector output statistic using a scale factor defined as:

$$scaleFactor = \frac{\min(I_{filter,cross}(x, y) * h_{2a}, I_{filter,cross}(x, y) * h_{2b})}{\max(I_{filter,cross}(x, y) * h_{2a}, I_{filter,cross}(x, y) * h_{2b})};$$

where $h_2$, $h_{2a}$ $h_{2b}$ are defined as:

$$h_2(i, j) = \begin{cases} 1, 1 \le i < M \\ 0, i < M \\ 1, M < i \le 2M + 1 \end{cases}, \quad h_{2a}(i, j) = \begin{cases} 1, 1 \le i < M \\ 0, M \le i \le 2M + 1 \end{cases},$$

$$h_{2b}(i, j) = \begin{cases} 0, 1 \le i \le M \\ 1, M < i \le 2M + 1 \end{cases} \text{ and } h_2(i, j) = h_{2a}(i, j) + h_{2b}(i, j)$$

and $I_{filter,cross}$ (x,y)*$h_{2b}$ represents a 2D convolution that calculates the average of pixels to the right of an area of interest at coordinates (x,y), $I_{filter,cross}$(x,y)*$h_{2a}$ represents a 2D convolution that calculates the average of pixels to the left of an area of interest at coordinates (x,y), min(x,y)=x if x≤y, and min(x,y)=y if y<x; and wherein the polarimetric manmade object detector PMOD is calculated according to the equation $$PMOD(x, y) = T_1(x, y) scaleFactor \text{ where } T_1(x, y) = \frac{I_{filter,co}(x, y)}{I_{cross\ contrast}(x, y)},$$

where $I_{filter,\,co}(x,y)$ denotes the filtered co-polarimetric image; and the at least one processor configured to create a two-dimensional array of values denoted PMOD image to determine if the object under investigation is man-made.

17. The system of claim 16 wherein the at least one processor is configured to perform a summation operation on the pixels in the vicinity of an area of interest in the PMOD image and normalize the summation total by dividing by the number of pixels in the area summed to obtain a value indicative of the normalized intensity of the background; and wherein the at least one processor is configured to perform a summation operation on the pixels in an area of interest in the PMOD image and normalize the summation total by dividing by the number of pixels in the area of interest indicative of the normalized intensity of the area of interest; and wherein the at least one processor operates to divide the normalized intensity of the area of interest by the normalized intensity of the background to obtain a PMOD image value indicative of the presence of a man-made object.

18. The system of claim 17 wherein the at least one processor is configured to perform a summation operation on the pixels in the vicinity of the pixels of interest in the co-polarized image and normalize the summation total by dividing by the number of pixels in the area summed to obtain a value indicative of the normalized intensity of the background; and wherein the at least one processor is configured to perform a summation operation on the pixels in an area of interest in the co-polarized image and normalize the summation total by dividing by the number of pixels of interest to obtain a normalized intensity of the pixels of interest; and wherein the at least one processor operates to normalize intensity of the pixels of interest by the normalized intensity of the background to obtain a value indicative of the presence of a man-made object.

19. The system of claim 18 wherein the at least one processor is configured to perform a summation operation on the pixels in the pixels in the vicinity of an area of interest in the cross-polarized image and normalize the summation total by dividing by the number of pixels in the area summed to obtain a value indicative of the normalized intensity of the background; and wherein the at least one processor is configured to perform a summation operation on the pixels in an area of interest in the cross-polarized image and normalize the summation total by dividing by the number of pixels in the area of interest indicative of the normalized intensity of the area of interest; and wherein the at least one processor operates to divide the normalized intensity of the area of interest by the normalized intensity of the background to obtain a value indicative of the presence of a man-made object and wherein the at least one processor multiplies the normalized summations on the pixels in the vicinity of an area of interest for at least two of the PMOD image, the cross-polarized image and the co-polarized image to provide an enhanced indication of the presence of a man-made object.

20. The system of claim 13 wherein the at least one processor performs spatial averaging at a plurality of pixel locations using the equation $$I_{filter}(x, y) = \sum_{i=0}^{N_p} I(x, y - \lfloor N_p/2 \rfloor + i)$$

where $I(x,y)$ denotes the pixel location of the image from either co-polarimetric or cross polarimetric radar data at pixel $(x,y)$, $N_p$ is the number of pixels used for spatial averaging, and $\lfloor N_p/2 \rfloor$ denotes the largest integer less than or equal to $N_p/2$, and $N_p$ possibly equal to zero for the co-polarimetric image and wherein the at least one processor utilizes the complex magnitude of each component image pixel, thereby enabling the exploitation of spatial averaging for speckle reduction and wherein the at least one processor utilizes a floor value for pixel values within the cross-pol image, such that $I_{cross}(x,y)=\max(\text{floor value}, I_{cross}(x,y))$, where $\max(x,y)=x$ if $x \geq y$ and $\max(x,y)=y$ if $y>x$.

* * * * *